US009020195B2

(12) United States Patent
Yamashita

(10) Patent No.: US 9,020,195 B2
(45) Date of Patent: Apr. 28, 2015

(54) OBJECT TRACKING DEVICE, OBJECT TRACKING METHOD, AND CONTROL PROGRAM

(75) Inventor: Takayoshi Yamashita, Kyoto (JP)

(73) Assignee: OMRON Corporation, Kyoto (JP)

( * ) Notice: Subject to any disclaimer, the term of this patent is extended or adjusted under 35 U.S.C. 154(b) by 67 days.

(21) Appl. No.: 13/985,086

(22) PCT Filed: Mar. 17, 2011

(86) PCT No.: PCT/JP2011/056475
§ 371 (c)(1),
(2), (4) Date: Sep. 24, 2013

(87) PCT Pub. No.: WO2012/120696
PCT Pub. Date: Sep. 13, 2012

(65) Prior Publication Data
US 2014/0010409 A1 Jan. 9, 2014

(30) Foreign Application Priority Data
Mar. 10, 2011 (JP) ................................. 2011-053619

(51) Int. Cl.
G06K 9/00 (2006.01)
G06K 9/48 (2006.01)
G06T 7/20 (2006.01)
G06K 9/62 (2006.01)
G06K 9/32 (2006.01)

(52) U.S. Cl.
CPC ... *G06K 9/00342* (2013.01); *G06T 2207/30196* (2013.01); *G06K 9/48* (2013.01); *G06T 7/2046* (2013.01); *G06K 9/6204* (2013.01); *G06K 2009/3291* (2013.01); *G06T 2207/10016* (2013.01); *G06T 2207/20076* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| 6,724,915 | B1 * | 4/2004 | Toklu et al. | 382/103 |
|---|---|---|---|---|
| 8,135,209 | B2 * | 3/2012 | Ikeda | 382/154 |
| 8,830,236 | B2 * | 9/2014 | Germann et al. | 345/420 |
| 2009/0129675 | A1 * | 5/2009 | Eggert et al. | 382/173 |

FOREIGN PATENT DOCUMENTS

JP 2009-224924 A 10/2009

OTHER PUBLICATIONS

International Search Report issued in PCT/JP2011/056475 mailed on Apr. 26, 2011 (2 pages).

(Continued)

*Primary Examiner* — Anand Bhatnagar
*Assistant Examiner* — Soo Park
(74) *Attorney, Agent, or Firm* — Osha Liang LLP

(57) ABSTRACT

An object tracking device which tracks a target object in a time-series image including a plurality of frames has a location information acquisition unit that acquires location information of a target object in a first frame, the target object being a tracked target, a detailed contour model generation unit that generates a detailed contour model in the first frame, on the basis of the location information, the detailed contour model being formed with a plurality of contour points representing a contour of the target object, and a search location setting unit that sets a plurality of different search locations in a second frame, the second frame being any one of frames following the first frame.

20 Claims, 9 Drawing Sheets

(56) References Cited

OTHER PUBLICATIONS

Paragios, N. et al.; "Geodesic Active Contours and Level Sets for the Detection and Tracking of Moving Objects"; IEEE Transactions on Pattern Analysis and Machine Intelligence, vol. 22, No. 3, Mar. 2000, pp. 266-280 (15 pages).

Nummiaro, K. et al.; "An Adaptive Color-Based Particle Filter"; Image ad Vision Computing, vol. 21, Issue 1, Sep. 19, 2002, pp. 1-22 (22 pages).

* cited by examiner

OBJECT TRACKING DEVICE, OBJECT TRACKING METHOD, AND CONTROL PROGRAM

BACKGROUND

1. Technical Field

The present invention relates to a technique of tracking the movement of a target object in a moving image.

2. Related Art

Conventionally, a technique for tracking an object in a moving image has been utilized.

There is a tracking technique based on a color, as one of conventional object tracking techniques (Non-patent Document 1). In this technique, regions having similar colors in individual frames of a moving image are regarded as the same target object, and these similar-color regions are tracked over the frames, so that the location of the target object is tracked.

Moreover, there is another tracking technique based on a contour (Non-patent Document 2). In this technique, a contour model of a tracked target object is first created, and a contour similar to the contour model is searched for while the contour model is being slightly moved, so that the location of the tracked target object is tracked. This technique is based on the premise that the tracked target object is not moved broadly in a time interval.

Moreover, there is a tracking technique for tracking a contour shape with a particle filter, as another tracking technique based on a contour (Patent Document 1). In this technique, a contour line of a candidate whose shape is the same as that of a tracked target object is expressed by a single particle, and a plurality of particles are introduced as tracked candidates. Then, each particle is transited on the basis of a movement model, and a likelihood of the candidate contour line defined by each particle is observed after the transition, so that the location of the tracked target object is tracked.

Patent Document 1: Japanese Unexamined Patent Publication No. 2009-224924 (published on Oct. 1, 2009).

Non-patent Document 1: Katja Nummiaro et al., "An adaptive color-based particle filter", Image and Vision Computing, Vol. 21, Issue. 1, pp. 99-110, 2003

Non-patent Document 2: Nikos Paragios and Rachid Deriche, "Geodesic active contours and level sets for the detection and tracking of moving objects", IEEE Trans. PAMI, Vo. 22, Issue. 3, pp. 266-280

SUMMARY

In the technique of Non-patent Document 1, as described above, the similar-color regions are regarded as the same target object. Therefore, a target object may be mistakenly changed from a real target object to a background having a color similar to that of the real target object, namely, the capability in following a tracked target object is degraded.

The technique of Non-patent Document 2 is based on the premise that the tracked target object is not moved broadly in a time interval. Therefore, in the case where a camera and a person move hard, such as when a person is captured by a digital camera, or in the case where the tracked target object has a complex contour, a processing time may increase, namely, a process speed decreases.

In Patent Document 1, when the number of particles is increased in order to enhance the capability in following a tracked target object, the throughput may increase, causing the processing speed to be decreased. Meanwhile, when the number of particles is decreased in order to increase the processing speed, the capability in following the shape variation in a tracked target object may be degraded.

As described above, there are no techniques that ensure both capability in following a tracked target object and high-speed processing.

One or more embodiments of the present invention provides an object tracking device and object tracking method that can ensure both capability in following a tracked target object and high-speed processing.

An object tracking device according to one or more embodiments of the present invention which tracks a target object in a time-series image including a plurality of frames includes: a location information acquisition unit that acquires location information of a target object, which is a tracked target, in a first frame; a detailed contour model generation unit that generates a detailed contour model in the first frame, on the basis of the location information, the detailed contour model being formed with a plurality of contour points representing a contour of the target object; a search location setting unit that sets a plurality of different search locations in a second frame which is any one of frames following the first frame; a rough contour model generation unit that identifies a plurality of first associated points at each search location in the second frame which correspond to locations of the plurality of contour points, when the detailed contour model is applied to each search location, that selects, as second associated points, a first predetermined number of points out of the plurality of first associated points which are fewer than the plurality of first associated points, and that generates a rough contour model formed with the second associated points; a likelihood assessment unit that compares, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification unit that identifies the location of the target object from the plurality of search locations, on the basis of the likelihoods determined by the likelihood assessment unit.

An object tracking method according to one or more embodiments of the present invention in which an object is tracked in a time-series image including a plurality of frames includes: a location information acquisition step of acquiring location information of a target object, which is a tracked target, in a first frame; a detailed contour model generation step of generating a detailed contour model in the first frame, on the basis of the location information, the detailed contour model being formed with a plurality of contour points representing a contour of the target object; a search location setting step of setting a plurality of different search locations in a second frame which is any one of frames following the first frame; a rough contour model generation step of identifying a plurality of first associated points corresponding to locations of the plurality of contour points at each search location in the second frame, when the detailed contour model is applied to each search location, and selecting, as second associated points, a first predetermined number of points out of the plurality of first associated points which are fewer than the plurality of first associated points, and generating a rough contour model formed with the second associated points; a likelihood assessment step of comparing, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification step of identifying the location of the target object from the plurality of search locations, on the basis of the likelihoods determined at the likelihood assessment step.

Herein, the image feature amount refers to a feature amount, such as a brightness difference or edge intensity, that is obtained from pixel values of pixels related to (corresponding to) the associated points or contour points.

With the above configuration, the rough contour model that is formed with the second associated points being fewer than the contour points constituting the detailed contour model is generated at each search location, and a location of the target object is tracked with the rough contour model. This makes it possible to make processing required to track the target object (for example, respective processes performed by a generation unit of the rough contour model and the likelihood assessment unit) faster than that of generating the detailed contour model at each search location (for example, as in Patent Document 1 or 2).

Furthermore, using the rough contour model makes it possible to improve the capability in following the target object, because even if a shape of the target object is changed with time, the changed shape of the target object is quite likely to match a shape of the rough contour model.

In addition, using the rough contour model makes it possible to reduce the throughput at each search location, thereby increasing the number of the search locations. This also improves the capability in following a target object.

Consequently, it is possible to ensure both capability in following a target object and high-speed processing.

As described above, the object tracking device according to one or more embodiments of the present invention which tracks a target object in a time-series image including a plurality of frames includes: a location information acquisition unit that acquires location information of a target object, which is a tracked target, in a first frame; a detailed contour model generation unit that generates a detailed contour model in the first frame, on the basis of the location information, the detailed contour model being formed with a plurality of contour points representing a contour of the target object; a search location setting unit that sets a plurality of different search locations in a second frame which is any one of frames following the first frame; a rough contour model generation unit that identifies a plurality of first associated points at each search location in the second frame which correspond to locations of the plurality of contour points, when the detailed contour model is applied to each search location, that selects, as second associated points, a first predetermined number of points out of the plurality of first associated points which are fewer than the plurality of first associated points, and that generates a rough contour model formed with the second associated points; a likelihood assessment unit that compares, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification unit that identifies the location of the target object from among the plurality of search locations, on the basis of the likelihoods determined by the likelihood assessment unit.

The object tracking method according to one or more embodiments of the present invention in which an object is tracked in a time-series image including a plurality of frames includes: a location information acquisition step of acquiring location information of a target object, which is a tracked target, in a first frame; a detailed contour model generation step of generating a detailed contour model in the first frame, on the basis of the location information, the detailed contour model being formed with a plurality of contour points representing a contour of the target object; a search location setting step of setting a plurality of different search locations in a second frame which is any one of frames following the first frame; a rough contour model generation step of identifying a plurality of first associated points corresponding to locations of the plurality of contour points at each search location in the second frame, when the detailed contour model is applied to each search location, and selecting, as second associated points, a first predetermined number of points out of the plurality of first associated points which is fewer than the plurality of first associated points, and generating a rough contour model formed with the second associated points; a likelihood assessment step of comparing, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification step of identifying the location of the target object from among the plurality of search locations, on the basis of the likelihoods determined at the likelihood assessment step.

Consequently, it is possible to ensure both capability in following a target object and high-speed processing.

DETAILED DESCRIPTION

An object tracking system that is installed in a digital camera and keeps focusing a target object while tracking the target object in a captured moving image is described below; however the present invention is not limited to this. Hereinafter, embodiments of the present invention will be described with reference to FIGS. 1 to 10.

(Configuration of Object Tracking System)

Figure 1:
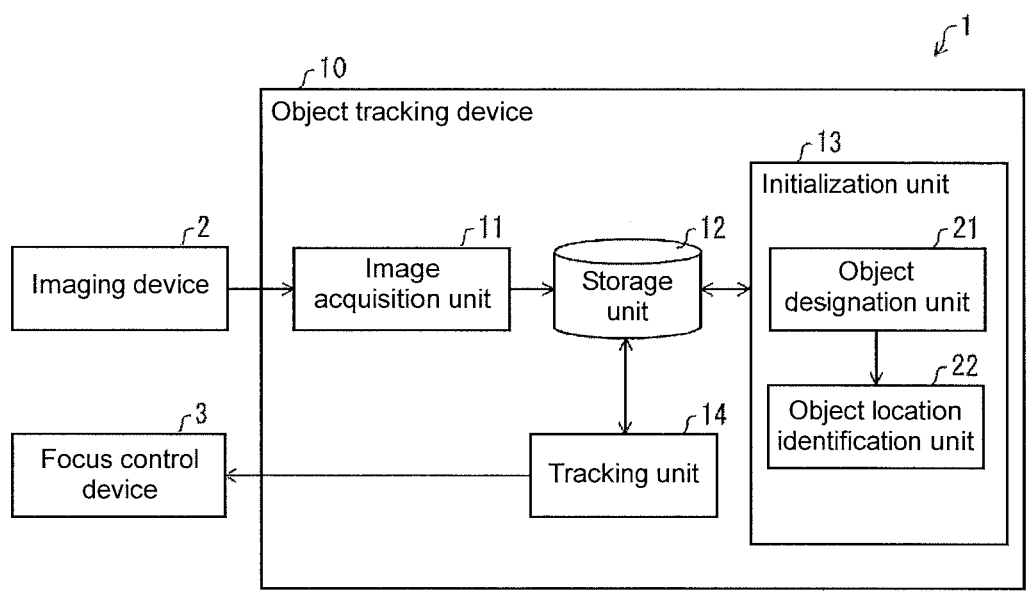
FIG. 1 is a block diagram of a general configuration of an object tracking system according to one or more embodiments of the present invention.

FIG. 1 is a block diagram of a general configuration of an object tracking system 1 according to one or more embodiments of the present invention. The object tracking system 1 includes an imaging device 2, a focus control device 3, and an object tracking device (target object tracking device) 10.

The imaging device 2 captures a moving image. The imaging device 2 is configured of imaging elements, such as CCDs (charge coupled devices) or CMOS (complementary metal oxide semiconductor) imaging elements. In one or more embodiments of the present invention, the imaging device 2 captures images of 30 frames within a second. The imaging device 2 outputs the captured moving image to the object tracking device 10, as images of a plurality of frames which are arranged in a time-sequential order.

The object tracking device 10 tracks a target object, which is a tracked target, in a time-series image, and outputs a location of the target object in the image to the focus control device 3. A detailed configuration of the object tracking device 10 will be described later.

The focus control device 3 adjusts a focus of the imaging device 2, on the basis of the location of the target object in the image which has been entered from the object tracking device 10.

Next, a description will be given of a detailed configuration of the object tracking device 10. The object tracking device 10 includes an image acquisition unit 11, a storage unit 12, an initialization unit 13, and a tracking unit 14.

The image acquisition unit 11 sequentially acquires a time-series image from the imaging device 2, and causes the storage unit 12 to store the time-series image.

The storage unit 12 stores various types of information, and is configured of a storage device, such as a HDD (hard disk drive) or a flash memory. The storage unit 12 stores the time-series image that the image acquisition unit 11 has acquired. In addition, the storage unit 12 stores various types of information that the initialization unit 13 and the tracking unit 14 have output.

The initialization unit 13 identifies the target object, which is the tracked target, in an image, and the tracking unit 14 tracks the above target object in the time-series image.

(Configuration of Initialization Unit)

The initialization unit 13 includes an object designation unit 21, and an object location identification unit (location information acquisition unit) 22.

Figure 3A:
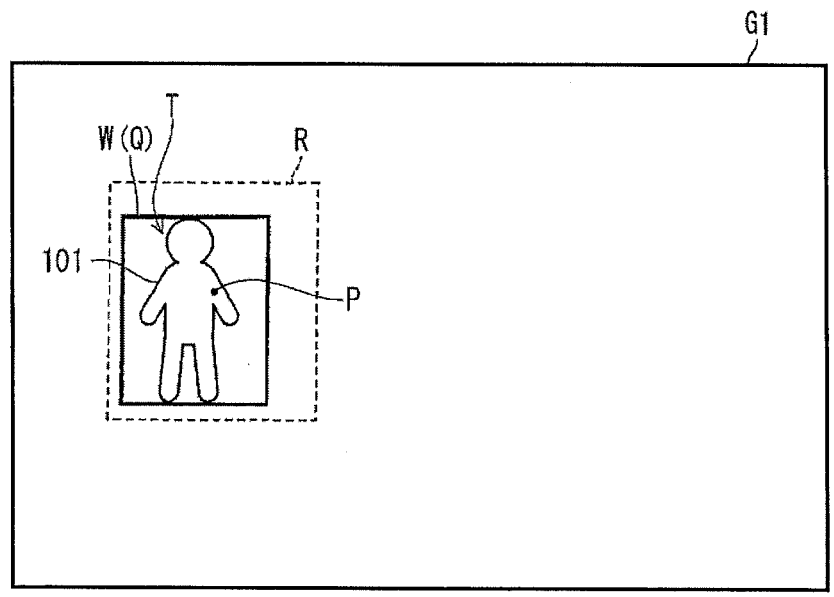
FIG. 3(a) is a view depicting an example of a tracking process for an image of a certain frame, and FIG. 3 (b) is a view depicting an example of a tracking process for an image of the following frame.

The object designation unit 21 identifies the target object T, which is the tracked target, in an image G1 of a certain frame, as in FIG. 3(a). For example, the object designation unit 21 receives an input of information indicating at which location of the image G1 the target object T, which is the tracked target, is present. For example, a digital video camera provides a user with a captured image through a display device equipped with a touch panel, and the user designates a location (for example, a location P) at which the target object T, which is the tracked target, is present, through the touch panel. The object designation unit 21 outputs the information of the designated location P to the object location identification unit 22.

Alternatively, the object designation unit 21 may receive information indicating a region in which the target object T is present.

The object location identification unit 22 searches the image G1 for the target object T, on the basis of the location P that the object designation unit 21 has designated, thereby identifying a location Q at which the target object T is present.

In more detail, the object location identification unit 22 acquires the image G1 of a frame (first frame) at a certain time point (for example, the latest frame) from the storage unit 12. The object location identification unit 22 detects the target object T in a region R of a predetermined region size (for example, a region with 100×100 pixels centered on the location P) in the image G1 which contains the designated location P, as in FIG. 3(a). This detection of the target object T may employ a known technique, such as color detection or edge detection.

The object location identification unit 22 sets a rectangular region W containing the detected target object T to a location Q at which the target object T is present. Here, as the detected target object T increases in size, the region W is set so as to be larger. In this case, the location Q of the target object T is defined using the region W in which the target object T is present. However, the location Q of the target object T may be defined by the center of the region W. In addition, the region W may be either of a region having another shape such as a circular shape or a region having a predetermined size.

The object location identification unit 22 causes the storage unit 12 to store information of the location Q of the target object T in relation to the image G1 of this frame.

Alternatively, the object designation unit 21 may receive an input of a specific condition, and the object location identification unit 22 may detect the location Q of the target object T on the basis of this condition. For example, when the object designation unit 21 receives an input of a condition "the target object is a face," the object location identification unit 22 may detect faces from the whole of an image. Then, the object location identification unit 22 may set any one of the detected faces to the target object, detecting the location Q of this face. Moreover, when the object designation unit 21 receives an input of a condition "the target object is a square object," the object location identification unit 22 may set any one of square objects detected from the image to the target object, detecting the location Q of this square object, similar to the above.

In this way, the location Q of the target object T is identified in the image G1 of the certain frame (first frame), and information of this is stored in the storage unit 12 by the initialization unit 13. On the basis of this information, the tracking unit 14 acquires information for tracking the target object T by using any (second frame) of frames following the first frame, and tracks the target object T. Hereinafter, the second frame is a frame subsequent to the first frame, for the sake of description's convenience; however it may follow the first frame with one or more frames therebetween.

(Configuration of Tracking Unit)

Figure 2:
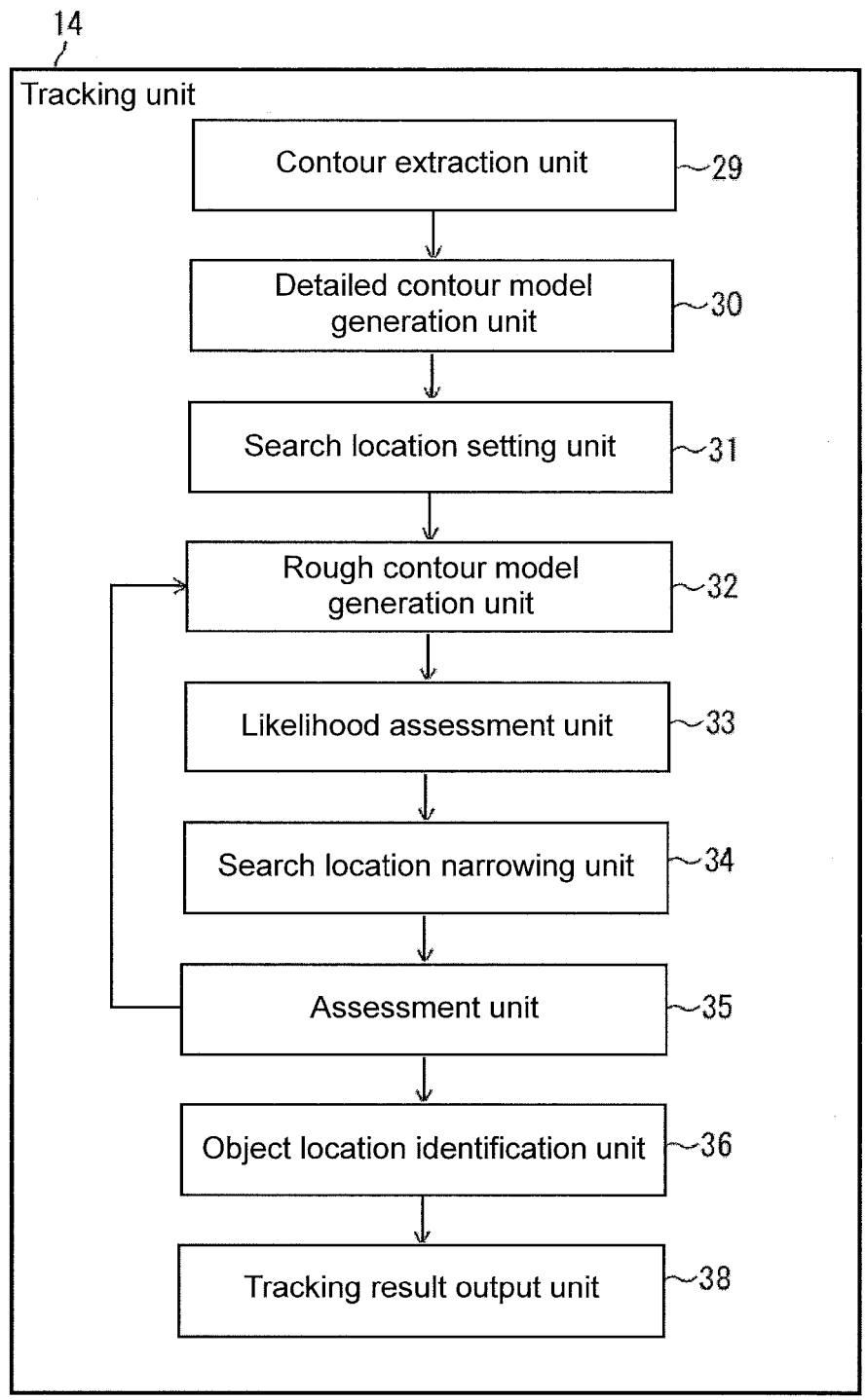
FIG. 2 is a block diagram of a configuration of a tracking unit of the above object tracking system.

FIG. 2 is a block diagram of a configuration of the tracking unit 14. The tracking unit 14 includes a contour extraction unit 29, a detailed contour model generation unit 30, a search location setting unit 31, a rough contour model generation unit 32, a likelihood assessment unit 33, a search location narrowing unit 34, an assessment unit (search location number assessment unit) 35, an object location identification unit (location information acquisition unit) 36, and a tracking result output unit 38.

Figure 3B:
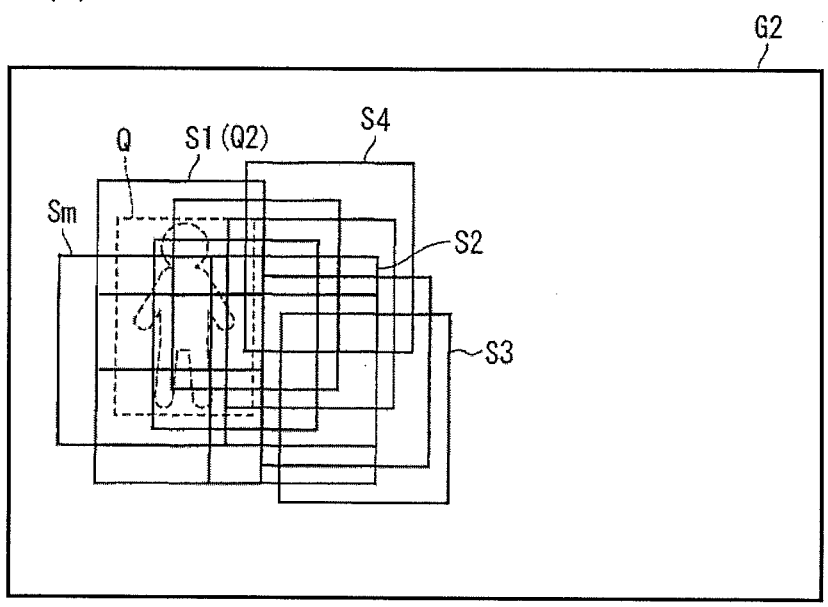
Figure 4:
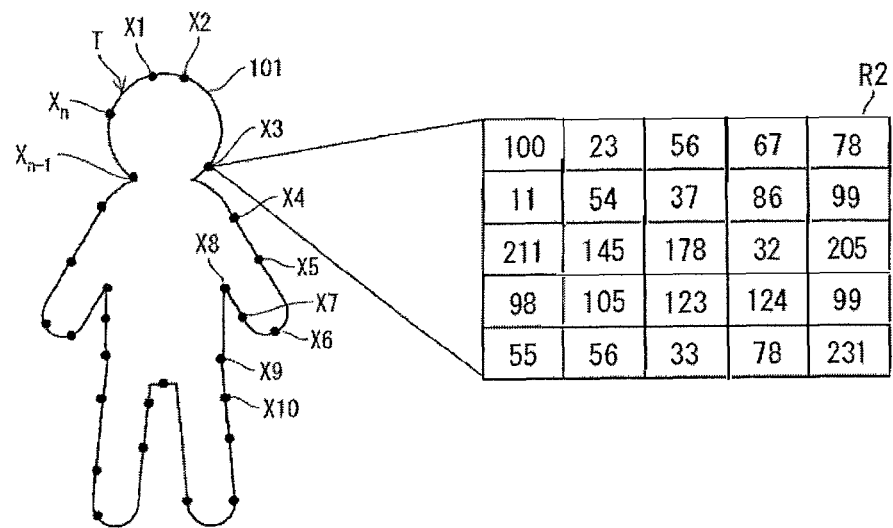
FIG. 4 is an explanatory view of a detailed contour model.

The image acquisition unit 11 acquires, from the imaging device 2, the image G2 (see FIG. 3(b)) of a frame subsequent to the image G1 in which the initialization unit 13 has identified the location Q of the target object T which is the tracked target. Then, the image acquisition unit 11 causes the storage unit 12 to store the image G2. The tracking unit 14 generates a detailed contour model of the target object T by using the image G1 stored in the storage unit 12. In addition, the tracking unit 14 dynamically generates a plurality of rough contour models that become candidates for the tracked target, by using the image G2 stored in the storage unit 12 and on the basis of the above detailed contour model. Then, the tracking unit 14 narrows the candidates by gradually specifying the rough contour models, thereby tracking the target object T in the image G2. Hereinafter, a process target frame that undergoes a tracking process performed by the tracking unit 14 is referred to as a current frame, and an image of the current frame is referred to as a process target image.

The contour extraction unit 29 extracts a contour of the target object T by using the image G1 stored in the storage unit 12 and on the basis of the location Q of the target object T which the object location identification unit 22 of the initialization unit 13 has identified. In more detail, as in FIG. 4, the contour extraction unit 29 subjects the location Q of the target object T which the object location identification unit 22 has identified to a contour extraction process by using a known contour extraction method, such as Level Set, Snake or B-spline, thereby extracting a contour 101 of the target object T.

The detailed contour model generation unit 30 generates the detailed contour model of the target object T, on the basis of the contour 101 that the contour extraction unit 29 has extracted. In more detail, as in FIG. 4, the detailed contour model generation unit 30 extracts a plurality of (an n number of) contour points X1 to Xn along the contour 101 in the image G1 which the contour extraction unit 29 has extracted, thereby generating the detailed contour model formed with the plurality of contour points X1 to Xn.

This detailed contour model is a model generated by duplicating the contour 101 of the target object T in the image G1 with a cluster of the plurality of contour points X1 to Xn. It should be noted that each of the contour points X1 to Xn is not limited to a point on the contour 101, and may be a point in the vicinity of the contour 101.

Each of the contour points X1 to Xn is given an identification number along the contour 101, and the adjacent contour points along the contour can be distinguished from each other.

The detailed contour model generation unit 30 determines a feature amount (first image feature amount) for assessing the likelihood at each of the contour points X1 to Xn, and generates a template in which the feature amounts for assessing the likelihood are written. Specifically, as in FIG. 4, each of the contour points X1 to Xn corresponds to a region R2 for likelihood determination which has a predetermined region size (for example, 5×5 pixels) and contains a corresponding one of the contour points X1 to Xn. Further, the detailed contour model generation unit 30 uses a feature amount acquired from the pixel values in the region R2 for likelihood determination which corresponds to each of the contour points X1 to Xn, as the feature amount for likelihood determination at a corresponding one of the contour points X1 to Xn.

For this feature amount, for example, brightness, a color, edge strength, a gradient angle (edge angle) or the like may be used. For the feature amount for likelihood determination, for example, brightness, edge strength and the like may be used in combination. In this case, a brightness distribution in the region R2 for likelihood determination is used as the feature amount for determining this likelihood. It should be noted that in FIG. 4, a brightness distribution in the region R2 with 5×5 pixels for likelihood determination which corresponds to the contour point X3 is depicted, as an example.

The detailed contour model generation unit 30 causes the storage unit 12 to store the generated detailed contour model and template in relation to the image G1 of this frame.

The search location setting unit 31 sets a plurality of (an m number of) different search locations S1 to Sm that are to be used to search the process target image G2 of the current frame for the target object T, as in FIG. 3(b). In this case, each of the search locations S1 to Sm is defined by a region, similar to the location Q of the target object T, and is set to have the same shape and region size as those of the location Q of the target object T. It should be noted that if the location Q of the target object T is defined as a point (for example, a center point of the region W), each of the search locations S1 to Sm is also defined as a point.

In more detail, in the process target image G2, the search location setting unit 31 sets the plurality of search locations S1 to Sm around the location Q of the target object T in the image G1 of a frame that is immediately precedes the process target image G2, as in FIG. 3(b). Here, a method of setting the search locations S1 to Sm may employ, for example, a particle filter or a technique for searching partial regions. The search location setting unit 31 outputs respective pieces of information of the search locations S1 to Sm to the rough contour model generation unit 32.

The rough contour model generation unit 32 generates the rough contour model at each of the search locations S1 to Sm that the search location setting unit 31 has set, on the basis of the above detailed contour model.

Figure 5:
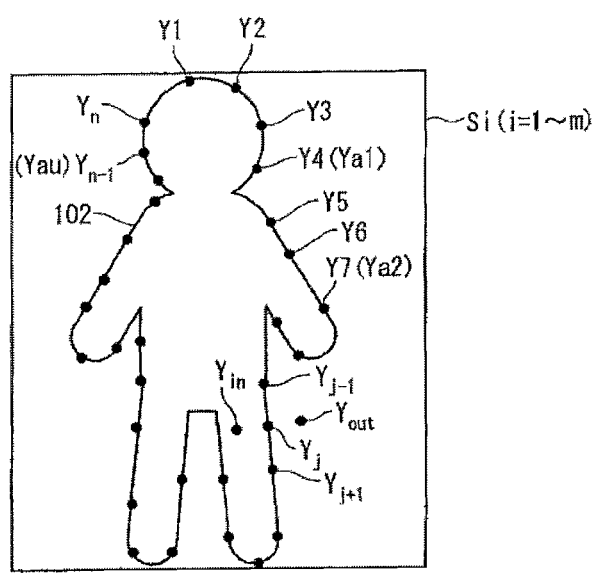
FIG. 5 is an explanatory view of a rough contour model.

In more detail, at each of the search locations S1 to Sm, the rough contour model generation unit 32 identifies a plurality of associated points (first associated points) Y1 to Yn that correspond to the plurality of contour points X1 to Xn of the detailed contour model, when the location Q of the target object T is aligned with each of the search locations Si (i=1 to m) (namely, when the detailed contour model is applied to each search location Si, as in FIG. 5. It should be noted that the plurality of associated points Y1 to Yn are given the same identification numbers as those of the corresponding contour points X1 to Xn, respectively.

At each of the search locations S1 to Sm, the rough contour model generation unit 32 selects a first predetermined number of (for example, a u number of) associated points (second associated points) Ya1 to Yau from among the plurality of associated points Y1 to Yn identified in the above manner. Then, the rough contour model generation unit 32 generates the rough contour model formed with the first predetermined number of associated points Ya1 to Yau. In this case, the first predetermined number is fewer than the plurality of associated points Y1 to Yn.

The above rough contour model is a model generated by duplicating the contour 101 of the target object T in the image G1 with a cluster of the associated points Ya1 to Yan being fewer than the plurality of contour points X1 to Xn in the detailed contour model. In other words, this rough contour model is a model generated by representing the contour 101 of the target object T in a simple (or rough) fashion. As the number of the associated points Ya1 to Yan is decreased, a rough (simple) degree of this rough contour model is increased.

More specifically, the rough contour model generation unit 32 first determines a feature amount for associated point selection (third image feature amount) at the associated points Yj (j=1 to n) in the process target image G2, in the following manner. In other words, as in FIG. 5, the rough contour model generation unit 32 determines the above feature amount for associated point selection at each associated point Yj in the process target image G2, on the basis of a pixel value (for example, brightness) of a region for associated point selection (first region) which corresponds to each associated point Yj (associated point of interest) and a pixel value (for example, brightness) of a region for associated point selection which corresponds to one or more reference points (for example, Yj−1, Yj+1, Yout and Yin) arranged at specific locations around each associated point Yj.

Here, the region for associated point selection which corresponds to each of the points Yj, Yj−1, Yj+1, Yout and Yin is a predetermined region containing each of the corresponding points Yj, Yj−1, Yj+1, Yout and Yin, for example, at the center thereof.

In this case, as in FIG. 5, the associated points Yj+1, Yj−1, Yin and Yout are used for the above reference points for the associated point Yj. The two associated points Yj+1 and Yj−1 are arranged adjacent to the associated point Yj along the contour 102, and the points Yin and Yout are arranged near the associated point Yj and on the inner and outer sides, respectively, of the contour 102. The associated points Yj+1 and Yj−1 are associated points that have identification numbers immediately preceding and following that of the associated point Yj, respectively. The contour 102 in the image G2 is a contour in the image G2 which corresponds to the contour 101 of the target object T when the location Q of the target object T is aligned with the search location Si.

Here, an average of respective distances between the associated point Yj and the reference point Yj+1 and between the associated point Yj and the reference point Yj−1 may be applied to each of respective distances between the reference point Yin and the associated point Yj and between the reference point Yout and the associated point Yj. In addition, respective orientations from the associated point Yj to the reference points Yin and Yout may employ orientations that are set, for example, such that an angle between Yout, Yj and Yj−1 is equal to an angle between Yout, Yj and Yj+1, and an angle between Yin, Yj and Yj−1 is equal to an angle between Yin, Yj and Yj+1. Alternatively, a contour is detected by connecting the plurality of associated points Y1 to Yn, and the reference points Yin and Yout may be arranged in the direction of the normal to a tangent line at the associated point Yj of the detected contour. Further, a distance between the points Yj and Yin may be an average of distances between the points Yj+1 and Yj and between Yj−1 and Yj. Moreover, instead of the contour generated by connecting the plurality of associated points Y1 to Yn, the above contour may be the contour 101 which becomes the basis for the plurality of contour points X1 to Xn corresponding to the plurality of associated points Y1 to Yn (namely, the contour extracted by the contour extraction unit 29).

For the feature amount for associated point selection at the associated point Yj, for example, a difference may be used between the maximum among differences in brightness between the associated point Yj and each of the reference points Yin, Yj−1 and Yj+1 and a difference in brightness between the associated point Yj and the reference point Yout in the image G2. Here, the difference in brightness is used for the feature amount for associated point selection at the associated point Yj, as described above. However, the feature amount is not limited to this. Alternatively, for example, edge strength in a contour portion along the points Yj−1, Yj and Yj+1 may be employed. Moreover, the brightness difference and the edge strength may be used in combination. A brightness difference among pixels around the associated point Yj (for example, a brightness difference between the associated point Yj and the reference point Yout) may be used.

The brightness differences between the associated point Yj and each of the reference points Yj−1, Yj+1, Yout and Yin are determined as follows. Regions for associated point selection that correspond to the points Yj, Yj−1, Yj+1, Yout and Yin, respectively, are regions in the image G2 and have the same region size (for example, 5×5 pixels). Then, it is assumed that the brightness difference (third pixel value difference) is determined between the points Yj and Yj−1. First, brightness differences are determined between respective pixels, at the same array location, in the regions for associated point selection corresponding to the points Yj and Yj−1, respectively. Followed by, the individual brightness differences (or the absolute values of the individual brightness values) are summed throughout the regions for associated point selection, and this resultant value is set to the brightness difference between the points Yj and Yj−1. This also applies to brightness differences between the associated point Yj and each of the other reference points Yj+1, Yout and Yin (third, second and first pixel value differences). It should be noted that this method of calculating the brightness difference is one example, and is not intended to limit the method. In this way, the feature amount for the associated point selection is determined at each associated point Yj.

In this case, the points Yj−1, Yj+1, Yout and Yin are used as the reference points for the associated point Yj; however only the points Yout and Yin may be used instead.

At each search location Si, the rough contour model generation unit 32 selects the one or more associated points Ya1 to Yau from among the plurality of associated points Y1 to Yn which represent the contour in the image G2 to a higher degree. Then, at each search location Si, the rough contour model generation unit 32 generates the rough contour model formed with the associated points Ya1 to Yau.

If the target object T has moved to the certain search location Si in the current frame, the contour of the target object T is quite likely to be positioned at the associated points Y1 to Yn of this search location Si, and the associated points Y1 to Yn would represent the contour. However, if the target object T has moved while deforming its contour, some of the associated points Y1 to Yn of this search location Si may not represent the contour even when the target object T has moved to the search location Si in the current frame. For this reason, the one or more associated points Ya1 to Yau that represent the contour in the image G2 of the current frame to a higher degree are selected (picked out), as points constituting the rough contour model. The rough contour model that is formed with the associated points Ya1 to Yau representing the contour in the image G2 to a high degree can be assumed to be an excellent, simple contour model for determining whether or not the target object Y has moved to the search location Si.

The degree to which the associated point Yj represents the contour can be expressed by, for example, edge strength at a location corresponding to the associated point Yj in the image G2. Alternatively, for example, the degree to which the associated point Yj expresses the contour can be expressed by a brightness difference between the inner and outer sides of the contour 102 corresponding to the associated point Yj in the image G2.

In more detail, the rough contour model generation unit 32 selects, from among the plurality of associated points Y1 to Yn at which the feature amounts for the associated point selection have been determined in the above manner, one or more that satisfy a preset knowledge. Then, the rough contour model generation unit 32 selects, from among the selected associated points, one or more at which feature amounts for the associated point selection fall within a ranking from the top to the first predetermined number-th (for example, u number-th) (namely, in a ranking order from the highest to first predetermined number-th), and generates the rough contour model formed with the first predetermined number of associated points Ya1 to Yau.

As the preset knowledge, for example, a preset knowledge may be utilized, in which looking at the associated point Yj, a brightness difference between the associated point Yj and the reference point Yout is larger than those between the associated point Yj and the reference point Yin, between the associated point Yj and the reference point Yj−1, and between the associated point Yj and the reference point Yj+1.

The feature amount for associated point selection (third image feature amount) at the associated point Yj considers the preset knowledge, and indicates a contour degree to which the associated point Yj represents the contour of the target object T. Specifically, if the target object T has moved to the search location Si in the current frame, it can be estimated that the brightness difference increases between the inner and outer sides of the contour 102 generated by connecting the plurality of associated points Y1 to Yn. Accordingly, the feature amount for associated point selection which considers the above preset knowledge becomes an index of indicating the contour degree to which each of the associated points Y1 to Yn represents the contour of the target object T. As the feature amount for associated point selection increases, the contour degree would increase. In one or more embodiments of the present invention, the plurality of associated points Y1 to Yn are narrowed to the more effective associated points Ya1 to Yau, on the basis of the above contour degree, and the rough contour model is created with the associated points Ya1 to Yau. Thus, this rough contour model becomes an effective mode with a small amount of information.

As described above, the rough contour model is generated with one or more of the plurality of associated points Y1 to Yn, at which feature amounts for associated point selection fall within the ranking from the top to the predetermined number-th. As a result, the rough contour model at each of the search locations S1 to Sm becomes an excellent model by which it is determined whether or not the target object T has moved to the search location Si with a small amount of information (a small number of associated points).

It should be noted that if the edge strength is used for the feature amount for associated point selection, the associated points are selected at which edge intensities fall within a ranking from the top to the first predetermined number-th.

Figure 6:
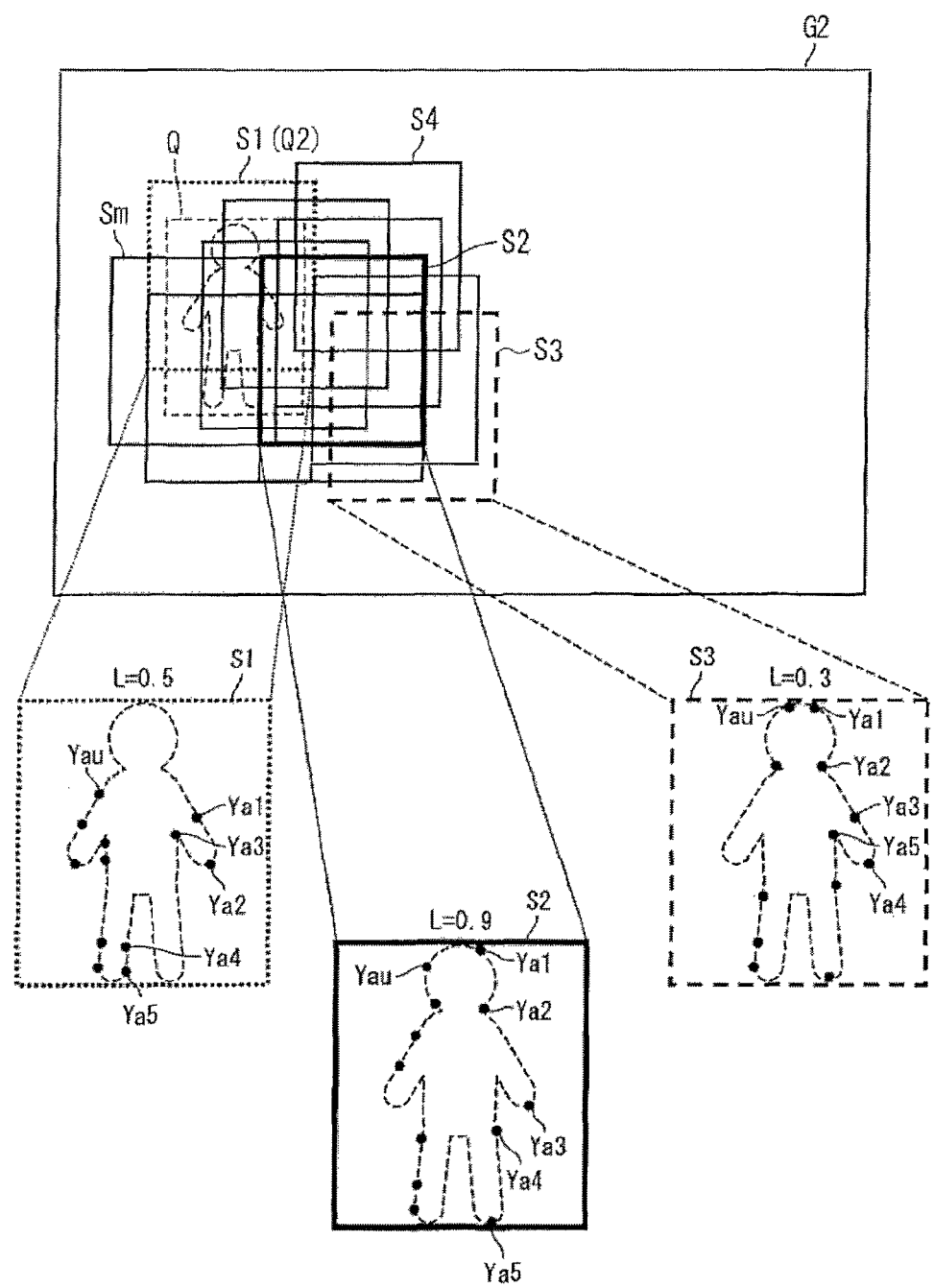
FIG. 6 is a view depicting an example of the rough contour model at each of search locations S1, S2 and S3.

The associated points Ya1 to Yau of the rough contour model at each of the search locations S1 to Sm are generated on the basis of the image G2 at this search location. Therefore, the individual combinations of the associated points Ya1 to Yau are differ from one another, although the associated points are the same in number (u), for example, as in FIG. 6. In FIG. 6, only the rough contour models at the search locations S1, S2 and S3 are depicted, for the sake of illustrative convenience.

The rough contour model generation unit 32 determines respective feature amounts for likelihood determination (second image feature amounts) at the associated points Ya1 to Yau of the rough contour model, at each of the search locations S1 to Sm, on the basis of pixel values in each of respective regions for likelihood determination which corresponds to the associated points Ya1 to Yau of the rough contour model, at each of the search locations S1 to Sm. The feature amounts for likelihood determination are used to assess the likelihoods with the likelihood assessment unit 33 as will be described later. The regions for likelihood determination which correspond to the associated points Ya1 to Yau are regions containing the corresponding associated points Ya1 to Yau at the centers thereof, respectively.

This feature amount for likelihood determination is a feature amount, the type of which is the same as that of the feature amount for likelihood determination (here, brightness distribution: first image feature amount) that has been determined from the pixel values in the region for likelihood determination which corresponds to each of the contour points X1 to Xn of the detailed contour model.

Here, the region for likelihood determination corresponding to each of the associated points Ya1 to Yau has the same region size (for example, a size of 5×5 pixels) as that of the region for likelihood determination corresponding to each of the contour points X1 to Xn of the detailed contour model; however, it does not need to have the same region size as that of the region for associated point selection corresponding to each of the associated points Y1 to Yn.

Specifically, the region for associated point selection corresponds to each of the associated points Y1 to Yn, and the region for likelihood determination corresponds to each of points Ya1 to Yau out of the associated points Y1 to Yn. The above region for likelihood determination has a fixed region size the same as that of the region for likelihood determination at each of the contour points X1 to Xn of the detailed contour model. However, the region size of the region for associated point selection is changed in accordance with an instruction signal from the assessment unit 35 as will be described later.

The rough contour model generation unit 32 outputs, to the likelihood assessment unit 33, information of the rough contour model at each of the search locations S1 to Sm (namely, information of the associated points Ya1 to Yau and information of the feature amount for likelihood determination at each of the associated points Ya1 to Yau).

When the rough contour model generation unit 32 acquires the instruction signal (namely, the instruction of decreasing the rough degree by one stage and re-generating the rough contour model) from the assessment unit 35 as will be described later, it increases the number (u) of associated points Ya1 to Yau of the rough contour model by a predetermined number, and re-generates the rough contour model only at each of the search locations that the search location narrowing unit 34 has narrowed, as will be described later.

Here, for example, the above predetermined number may be a predetermined fixed number or a number that is increased by a constant ratio in proportion to the number of associated points Ya1 to Yau at this time. As for a method of increasing the number of associated points Ya1 to Yau, the number of associated points Ya1 to Yau may be increased from 20% to 50% of the number of the contour points X1 to Xn in stages, in accordance with the above instruction signal.

Furthermore, in addition to or instead of the increase in the number of associated points Ya1 to Yau by the predetermined number, the region size of the region for associated point selection which corresponds to each of associated points Y1 to Yu may be increased by a predetermined size, and the feature amount for associated point selection may be determined on the basis of the region for associated point selection which has been increased by the predetermined size, similar to the above.

In the case where the region size of the region for associated point selection is increased to the predetermined size, region sizes of 1 pixel to 5×5 pixels may be prepared in stages. Then, 1 pixel may be initially prepared as a region size having the highest rough degree, and the region size of the region for associated point selection may be increased by 1 pixel along each of the longitudinal and lateral sides whenever the rough contour model generation unit 32 acquires the instruction signal (whenever the rough degree is decreased).

The rough contour model generation unit 32 determines a feature amount for likelihood determination of the rough contour model re-generated with a low rough degree (namely, the detailed rough contour model), similar to the above. In this case, the region for likelihood determination that corresponds to each of the associated points Ya1 to Yau is not changed, in contrast to the case of determining the feature amount for associated point selection as described above.

The rough contour model generation unit 32 outputs, to the likelihood assessment unit 33, information of the re-generated rough contour model at each of the search locations S1 to Sm (namely, information of the associated points Ya1 to Yau and information of the feature amount for likelihood determination at each of the associated points Ya1 to Yau).

When the likelihood assessment unit 33 receives the information of the rough contour model at each of the search locations S1 to Sm, it assesses a likelihood L of the rough contour model for the detailed contour model at each of the search locations S1 to Sm (namely, a likelihood that each search location Si is the location of the target object T in the image G2 of the current frame).

In more detail, the likelihood assessment unit 33 acquires, from the rough contour model generation unit 32, the information of the rough contour model at each of the search locations S1 to Sm (namely, information of the associated points Ya1 to Yau, and the feature amount for likelihood determination (for example, brightness distribution) at the search locations Ya1 to Yau). Then, the likelihood assessment unit 33 reads the template of the above detailed contour model (namely, the feature amount for likelihood determination (for example, brightness distribution) at the contour points X1 to Xn) from the storage unit 12.

The likelihood assessment unit 33 first determines a difference in feature amount for likelihood determination between each of the associated points Ya1 to Yau of the rough contour model at the search location Si (i=1 to m) in the image G2 and each of the counter points Xa1 to Xau out of the contour points X1 to Xn in the image G1 which correspond to the associated points Ya1 to Yau. In this way, the likelihood Lj for the contour point Xaj is determined at each associated point Yaj.

In this case, in the respective regions (regions of 5×5 pixels for likelihood determination) corresponding to the corresponding points Xaj and Yaj (j=1 to u), the likelihood assessment unit 33 determines a brightness difference between respective ones of these pixels which are positioned at the same array location. Then, the likelihood assessment unit 33 assesses the likelihood Lj for the contour point Xaj at the associated point Yaj by using the sum of the brightness differences (or the absolute values of the brightness differences). The above region for likelihood determination which corresponds to each point Xaj is a region of the image G1, and the above region for likelihood determination which corresponds to each point Yaj is a region of the image G2. Here, the likelihood Lj is defined, for example, as Lj=exp(−|sum of brightness differences|).

Figure 7:
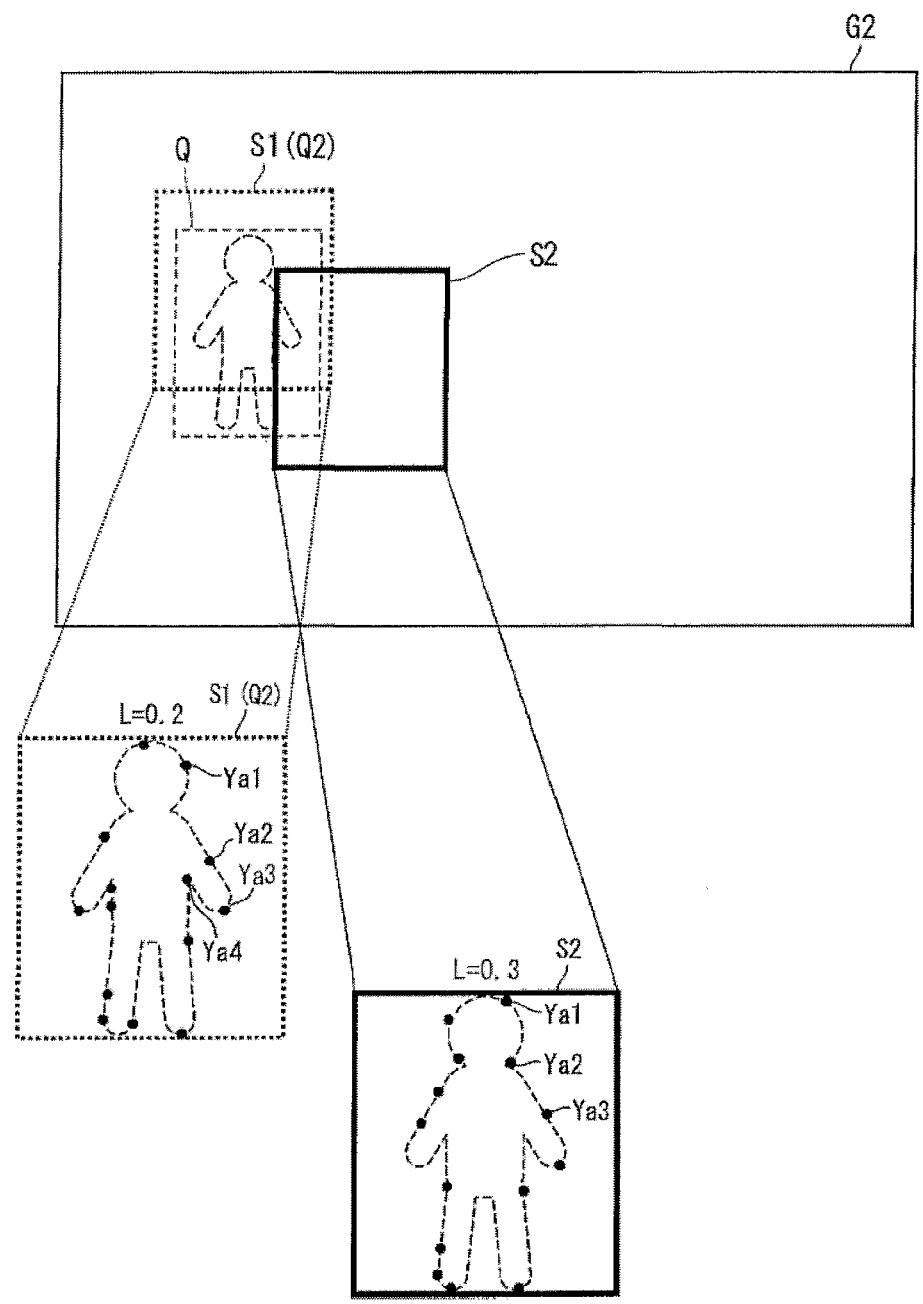
FIG. 7 is a view depicting an example in the case where the search locations are narrowed to two locations.

The likelihood assessment unit 33 assesses the likelihood L of the rough contour model at each search location Si for the detailed contour model (for example, L=(L1+L2+ . . . +Lu)/u) by using a result of summing, across the associated points Yaj (j=1 to u), the respective likelihoods Lj at the associated points Yaj. In this case, the maximum of the likelihood L is 1. FIG. 7 depicts a case where the likelihoods L of the contour models at the search locations S1, S2 and S3 are 0.5, 0.9 and 0.3, respectively, as an example.

It should be noted that the definition of the likelihood L is not limited to the above. The likelihood L, as defined above, increases, as the rough contour model is more similar to the detailed contour model. However, the likelihood L may be defined so as to decrease, as the rough contour model is more similar to the detailed contour model.

The likelihood assessment unit 33 outputs the information of the likelihood L of the rough contour model at each of the search locations S1 to Sm to the search location narrowing unit 34. If the likelihood assessment unit 33 receives information of the rough contour model that the rough contour model generation unit 32 has re-generated, it determines the likelihood L of the re-generated rough contour model, similar to the above, and outputs information of this likelihood L to the search location narrowing unit 34.

When the search location narrowing unit 34 receives the information of the likelihood L of the rough contour model at each of the search locations S1 to Sm, it narrows the plurality of search locations S1 to Sm on the basis of their likelihoods L. In this case, the search location narrowing unit 34 leaves only one or more of the plurality of search locations S1 to Sm, at each of which the likelihood L of the rough contour model has a predetermined value or more.

As a result, only the one or more of the plurality of search locations S1 to Sm, at each of which the rough contour model is similar to the detailed contour model to a predetermined degree or higher, are left. In other words, only the one or more of the plurality of search locations S1 to Sm, each of which has the higher likelihoods of being the location of the target object T in the image G2.

When the search location narrowing unit 34 receives the information of the likelihood L of the rough contour model that the rough contour model generation unit 32 has re-generated, it further narrows the narrowed search locations, similar to the above, on the basis of the likelihoods L. In other words, the search location narrowing unit 34 further narrows the narrowed search locations, similar to the above, by using the likelihoods L of the rough contour models that has been re-generated at the narrowed search locations.

Finally, the search location narrowing unit 34 outputs the information of the narrowed search locations to the assessment unit 35.

The assessment unit 35 determines whether or not the number of search locations that the search location narrowing unit 34 has narrowed is equal to or less than a second predetermined number (for example, 3).

If the determination result is that the number of narrowed search locations is equal to or less than the above second predetermined number, the assessment unit 35 outputs information of the narrowed search locations to the object location identification unit 36. Otherwise, if the determination result is that the number of narrowed search locations exceeds the above second predetermined number, the assessment unit 35 outputs, to the rough contour model generation unit 32, an instruction signal of decreasing the rough degree of the rough contour model by one stage and re-generating the rough contour model.

If the number of search locations narrowed by the search location narrowing unit 34 is one, the object location identification unit 36 identifies this search location, as the location Q2 of the target object T that is a tracked target in the process target image G2 of the current frame.

Otherwise, if the number of search locations narrowed by the search location narrowing unit 34 is equal to or more than two and equal to or less than the second predetermined number, the object location identification unit 36 narrows the narrowed search locations to the single search location, for example, by using color information. The narrowing technique using color information may be a known technique such as a color histogram, a gradient histogram, or Gabor Features.

In more detail, the object location identification unit 36 compares color information of a region surrounded by the plurality of associated points Y1 to Yn (namely, the candidates for the tracked target) at each of the search locations narrowed by the search location narrowing unit 34 with color information of the target object T in the image G1 of the preceding field. Then, the object location identification unit 36 identifies one of the search locations narrowed by the search location narrowing unit 34, at which color information is the most similar to that of the target object T, as the location Q2 of the target object T, which is the tracked target, in the process target image G2.

The object location identification unit 36 may narrow the search locations, which the search location narrowing unit 34 has narrowed, to the single search location by using edge information of all of these search locations.

The object location identification unit 36 outputs the information of the location Q2 of the target object T which has been identified in the above manner to the contour extraction unit 29. The contour extraction unit 29 extracts the contour of the target object T from the process target image G2, similar to the above, on the basis of the location Q2 that the object location identification unit 36 has identified. The object location identification unit 36 causes the storage unit 12 to store information of the location Q2 of the target object T, which has been identified in the above manner, in relation to the process target image G2.

As described above, the contour of the target object T which has been extracted from the process target image G2 of the current frame is used for the detailed contour model in the process target image G2, and becomes the basis for the rough contour model to be generated in the image of the frame following the current frame. Specifically, the tracking unit 14 generates the detailed contour model and the template in the process target image G2, similar to the above, by using the above contour of the target object T in the process target image G2 of the current frame. Then, the tracking unit 14 identifies the location of the target object T in the image of the frame following the current frame by using the detailed contour model and the template. This is repeated, so that the target object T is tracked in the image.

In the description of one or more embodiments of the present invention, the object location identification unit 36 and the search location narrowing unit 34 are configured separately from each other. However, the function of the search location narrowing unit 34 may be incorporated in the object location identification unit 36, and the search location narrowing unit 34 may be omitted.

In one or more embodiments of the present invention, the object location identification unit 22 and the object location identification unit 36 are configured separately from each other; however they may be combined into a single object location identification unit.

The contour extraction unit 29 causes the storage unit 12 to store the information of the contour of the target object T in the image G2 in relation to the process target image G2. In addition, the contour extraction unit 29 outputs the information of the contour of the target object T in the process target image G2 to the tracking result output unit 38.

The tracking result output unit 38 outputs the information of the location Q2 of the target object T in the process target image G2 to the focus control device 3.

(Description of Operation)

Figure 8:
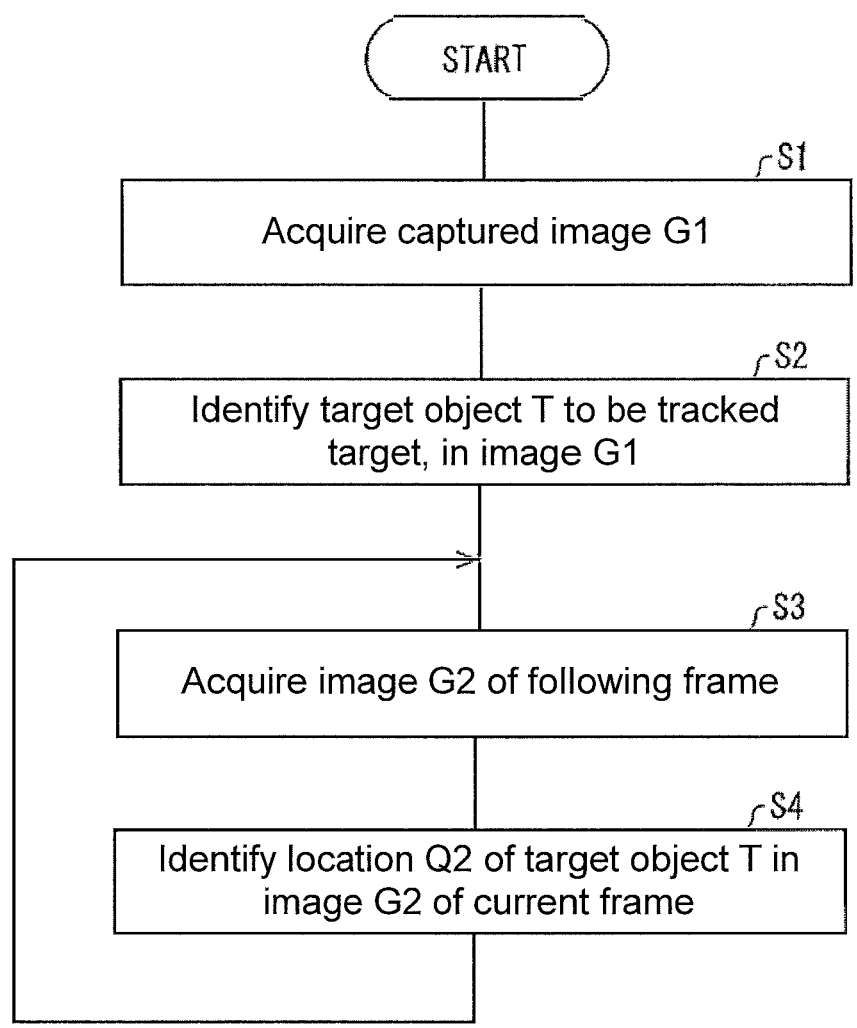
FIG. 8 is a flowchart of a summarized flow of an object tracking process performed by an object tracking device.

Next, an operation of the object tracking device 10 will be described. FIG. 3(a) is a view depicting an example of a tracking process for the image G1 of a certain frame, and FIG. 3(b) is a view depicting an example of a tracking process for the image G2 of the following frame. In the image G1 of the certain frame depicted in FIG. 3(a), the target object T is present in the image G1. Hereafter, a description will be given of an example of tracking the target object T. FIG. 8 is a flowchart of a summarized flow of a tracking process for the target object T which is performed by the object tracking device 10.

At Step S1, the image acquisition unit 11 acquires the captured image G1 from the imaging device 2, and causes the storage unit 12 to store the acquired image G1.

At Step S2, the initialization unit 13 acquires the image G1 of the certain frame from the storage unit 12, and identifies the target object T, which is the tracked target, in the image G1.

At Step S3, the image acquisition unit 11 acquires the image G2 of the following frame from the imaging device 2 as the process target image, and causes the storage unit 12 to store the acquired image G2.

As Step S4, the tracking unit 14 identifies the location Q2 of the target object T in the image G2 of the current frame. Afterward, the processes at Steps S3 and S4 are repeated for each frame, so that the target object T is tracked in the image.

(Initialization Process Flow)

Figure 9:
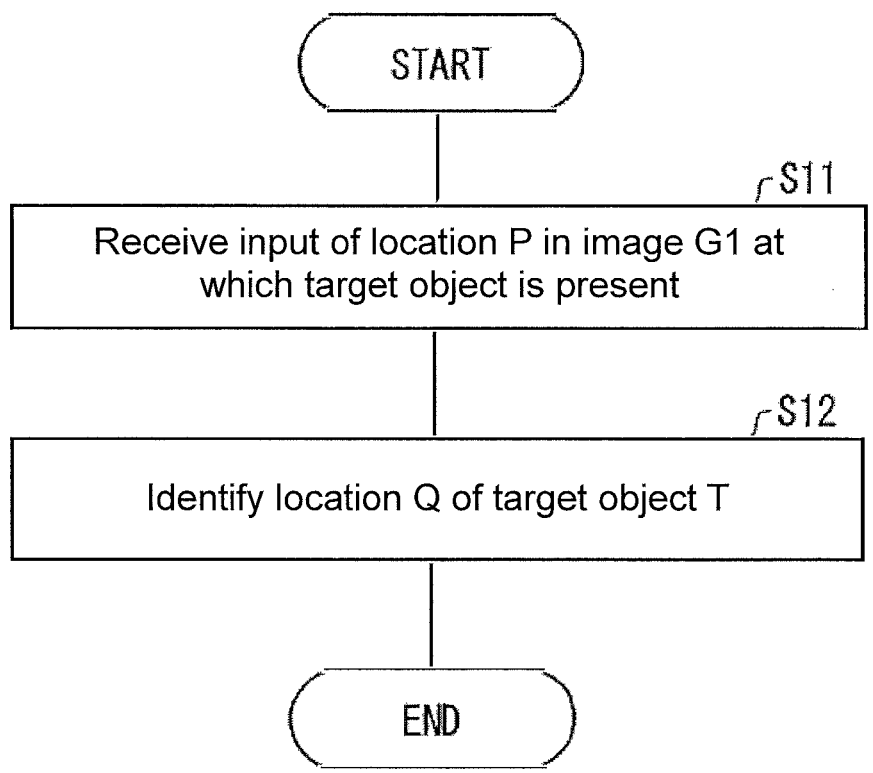
FIG. 9 is a flowchart of a flow of an initialization process performed by an initialization unit.

Next, a description will be given of a flow of a detailed process performed by the initialization unit 13. FIG. 9 is a flowchart of a flow of the initialization process performed by the initialization unit 13.

At Step S11, the object designation unit 21 receives, from a user, the input of the location P (see FIG. 3(a)) at which the target object T, which is the tracked target, is present in the image G1. In this case, the user designates the location P of the target object T through a touch panel.

At Step S12, the object location identification unit 22 detects the target object T from the predetermined region R containing the designated location P, identifying the location Q of the target object T. In this case, the location Q of the target object T is set as a rectangular region containing the target object T. Alternatively, the location Q of the target object T may be set, for example, as a center of the rectangular region containing the target object T. Through these steps, the process performed by the initialization unit 13 ends.

(Tracking Process Flow)

Figure 10:
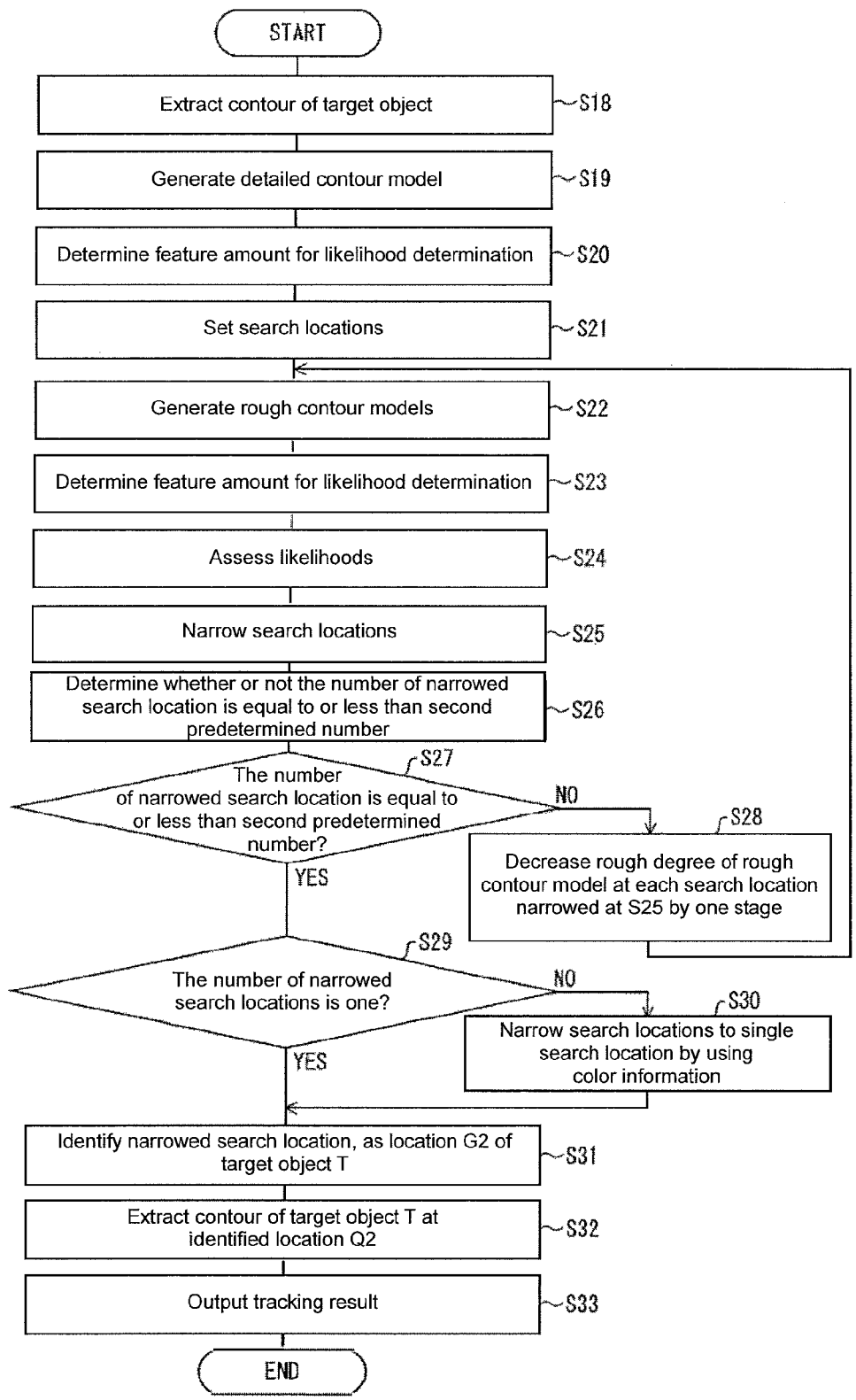
FIG. 10 is a flowchart of a flow of a tracking process performed by a tracking unit.

Next, a description will be given of a flow of a detailed process performed by the tracking unit 14. FIG. 5 is an explanatory view of the rough contour model that is generated at each of the search locations Si (i=1 to m) set in the image G2 of the following frame. FIG. 10 is a flowchart of a flow of a tracking process performed by the tracking unit 14.

At Step S18, the contour extraction unit 29 extracts the contour 101 (see FIG. 4) of the target object T that the object designation unit 21 has identified in the image G1 stored in the storage unit 12.

At Step S19, the detailed contour model generation unit 30 extracts the plurality of (an n number of) contour points X1 to Xn along the contour 101 that the contour extraction unit 29 has extracted in the image G1. Then, the detailed contour model generation unit 30 generates the detailed contour model formed with the plurality of contour points X1 to Xn. The information of this detailed contour model is stored in the storage unit 12, in relation to the image G1.

At Step S20, the detailed contour model generation unit 30 determines the feature amount for likelihood determination (for example, brightness, edge strength, or a gradient angle)

from pixel values in the region for likelihood determination which corresponds to each of the contour points X1 to Xn. Then, the detailed contour model generation unit 30 generates the template in which the feature amounts are written. The information of the template is stored in the storage unit 12, in relation to the image G1.

At Step S21, the search location setting unit 31 sets the plurality of (an m number of) different search locations S1 to Sm in the process target image G2, at each of which the target object T is to be searched. In more detail, the search location setting unit 31 sets the plurality of search locations S1 to Sm around the location Q of the target object T in the image G1 of a frame that is immediately precedes the process target image G2, as in FIG. 3(b).

At Step S22, on the basis of the detailed contour model generated at Step S19, the rough contour model generation unit 32 generates the rough contour model at each of the search locations S1 to Sm that the search location setting unit 31 has set.

In more detail, at each of the search locations Si (i=1 to m), the rough contour model generation unit 32 first identifies the plurality of associated points (first associated points) Y1 to Yn that correspond to the plurality of contour points X1 to Xn of the detailed contour model, when the location Q of the target object T is aligned with each search location Si (i=1 to m) (namely, when the detailed contour model is applied to each search location Si, as in FIG. 5. Then, at each of the search locations S1 to Sm, the rough contour model generation unit 32 selects a first predetermined number of (for example, a u number of) associated points (second associated points) Ya1 to Yau from among the plurality of associated points Y1 to Yn identified in the above manner. Then, the rough contour model generation unit 32 generates the rough contour model formed with the first predetermined number of associated points Ya1 to Yan.

Specifically, the rough contour model generation unit 32 first determines the feature amounts (for example, brightness distribution) for associated point selection, at the plurality of associated points Y1 to Yn. In other words, at each associated point Yj, the rough contour model generation unit 32 determines the feature amount for associated point selection, on the basis of pixel values in the region for associated point selection which corresponds to each of the associated points Yj (j=1 to n) and pixel values in the regions for associated point selection which correspond to the one or more reference points (for example, Yj−1, Yj+1, Yout and Yin) arranged at specific locations around each associated point Yj.

Then, the rough contour model generation unit 32 selects, from among the plurality of associated points Y1 to Yn at each of which the feature amounts for associated point selection have been determined in the above manner, one of more at which the feature amounts for associated point selection fall within a ranking from the top to the first predetermined number-th (for example, u-th). Followed by, the rough contour model generation unit 32 generates the rough contour model formed with the first predetermined number of associated points Ya1 to Yau.

At Step S23, the rough contour model generation unit 32 determines feature amounts for likelihood determination (for example, brightness distribution) at the associated points Ya1 to Yau of the rough contour model at each of the search locations S1 to Sm, on the basis of pixel values in the region for likelihood determination which corresponds to each of the associated points Ya1 to Yau of the rough contour model at each of the search locations S1 to Sm.

At Step S24, the likelihood assessment unit 33 assesses a likelihood L of the rough contour model for the detailed contour model, at each of the search locations S1 to Sm (namely, a likelihood that each search location Si is the location of the target object T in the image G2 of the current frame).

Specifically, the likelihood assessment unit 33 determines a difference in feature amount between the feature amount for likelihood determination (for example, brightness distribution), determined at Step S23, at each of the associated points Ya1 to Yau of the rough contour model at each of the search locations S1 to Sm and the feature amount for likelihood determination (for example, brightness distribution), determined at Step S20, at each of the contour points Xa1 to Xau out of the contour points X1 to Xn of the detailed contour model which correspond to the associated points Ya1 to Yau. As a result, the likelihood Lj for the contour point Xaj is determined at each associated point Yaj. The above region for likelihood determination which corresponds to each point Xaj is a region of the image G1, and the above region for likelihood determination which corresponds to each point Yaj is a region of the image G2.

In this case, in the respective regions corresponding to the corresponding points Xaj and Yaj (j=1 to u), a brightness difference is determined between the pixels positioned at the same array location. Then, the likelihood assessment unit 33 sums the brightness differences (or the absolute values of the brightness differences), and assesses the likelihood Lj for the contour point Xaj, at the associated point Yaj (for example, Lj=exp(−|sum of brightness differences|) by using the sum.

Followed by, the likelihood assessment unit 33 sums the likelihoods Lj at the associated points Yaj (j=1 to u), thereby assessing the likelihood L (for example, L=(L1+L2+ . . . +Lu)/u) of the rough contour model for the detailed contour model, at each search location Si.

At Step S25, the search location narrowing unit 34 narrows the plurality of search locations S1 to Sm to one or more search locations, on the basis of the likelihoods L that the likelihood assessment unit 33 has assessed. In this case, only one or more of the plurality of search locations S1 to Sm, at each of which the likelihood L of the rough contour model has a predetermined value or more, is left.

At Step S26, the assessment unit 35 determines whether or not the number of search locations that the search location narrowing unit 34 has narrowed is equal to or less than the second predetermined number (for example, 3). If the determination result exceeds the second predetermined number at Step S27, the processing proceeds to Step S28.

At Step S28, the assessment unit 35 outputs, to the rough contour model generation unit 32, an instruction signal (namely, an instruction signal of decreasing the rough degree of the rough contour model by one stage and re-generating the rough contour model). When the rough contour model generation unit 32 receives the above instruction signal from the assessment unit 35, the rough contour model generation unit 32 decreases the rough degree of the rough contour model by one stage, only at the search locations that the rough contour model generation unit 32 has narrowed at Step S25.

Specifically, the rough contour model generation unit 32 increases the region size of the region for associated point selection which corresponds to each of the associated points Y1 to Yn only at the search locations narrowed at Step S25 to a predetermined size, and increases the number (u) of the associated points Ya1 to Yau for constituting the rough contour model by a predetermined number.

The processing returns to Step S22, and at Step S25, the rough contour model generation unit 32 re-generates the rough contour model, only at each of the search locations narrowed at Step S25, under the condition that the rough degree of the rough contour model is decreased by one stage as described above. Followed by, at Step S23, the rough contour model generation unit 32 determines feature amounts for likelihood determination at the associated points Ya1 to Yau of the rough contour model re-generated at Step S22, similar to the above. At Step S24, the likelihood assessment unit 33 determines the likelihood L of the rough contour model re-generated at Step S22. At Step S25, the search location narrowing unit 34 further narrows the search locations that have been narrowed at previous Step S25, similar to the above. At Step S26, the assessment unit 35 determines whether or not the number of search locations that has been further narrowed is equal to or less than the second predetermined number, similar to the above. At Step S27, the processes at Steps S28, S22, S23, S24, S25, S26 and S27 are repeated, until the determination result becomes the second predetermined number or less.

If the determination result attained by the assessment unit 35 is equal to or less than the second predetermined number at Step S27, the processing proceeds to Step S29. For example, in the case where the second predetermined number is 3 and the narrowed search locations are S1 and S2, or two locations as in FIG. 7, the processing proceeds to Step S29.

If the number of search locations narrowed by the search location narrowing unit 34 is one at Step S29, the processing proceeds to Step S31, and the object location identification unit 36 identifies this search location, as the location Q2 of the target object T that is the tracked target in the process target image G2. Afterward, the tracking unit 14 would track the location of the target object T in the frame following the current frame, on the basis of the location Q2 identified by the object location identification unit 36 (namely, the location Q2 of the target object T in the image G2 of the current frame).

On the other hand, if the number of search locations narrowed by the search location narrowing unit 34 is not one (namely, equal to or more than two and equal to or less than the second predetermined number) at Step S29, the processing proceeds to Step S30, and the object location identification unit 36 narrows the narrowed search locations to the single search location, for example, by using color information (for example, a color histogram, a gradient histogram, Gabor Features, or the like).

In more detail, the object location identification unit 36 compares color information of a region surrounded by the plurality of associated points Y1 to Yn (namely, the candidates for the tracked target) at each of the search locations in the process target image G2 of the current frame which has been narrowed by the search location narrowing unit 34 with color information of the target object T in the image G1 of the preceding field. Then, the object location identification unit 36 narrows the search locations, which the search location narrowing unit 34 has narrowed, only to the single search location at which the color information are the most similar to that of the target object T. The processing proceeds to Step S31, and the object location identification unit 36 identifies this narrowed search location, as the location Q2 of the target object T that is the tracked target in the process target image G2.

For example, in FIG. 7, if the search location S1 is more similar in color information to the target object T than the search location S2 is, the search locations are narrowed to the search location S1, and the search location S1 is identified as the location Q2 of the target object T in the process target image G2.

At Step S32, the contour extraction unit 29 detects the target object T from the process target image G2, on the basis of the location Q2 identified at Step S31, and extracts the contour of the target object T. The contour of the target object T in the image G2 is used for the detailed contour model in the image G2 of the current frame, and becomes the basis for the rough contour model to be generated for the image of the following frame.

At Step S33, the tracking result output unit 38 outputs the information of the location Q2 of the target object T in the process target image G2 to the focus control device 3.

It should be noted that in the description of this "tracking process flow," when the rough degree is decreased by one stage at Step S28, (a) the region size of the region for associated point selection which corresponds to each of the associated points Y1 to Yn is increased to the predetermined size, and (b) the number (u) of the associated points Ya1 to Yau for constituting the rough contour model is increased by the predetermined number; however only either of (a) and (b) may be allowed.

In one or more embodiments of the present invention, the target object is detected and tracked from the captured moving image. However, the object tracking device 10 may also be applied to animation or some other moving image. In addition, as the target object, an image of the upper half or whole of a person may be detected, or an image of a ball, a vehicle or a conveyed baggage or an image of some other moving object may be detected. Moreover, the imaging device 2 is also applicable to even a still object, because it seems to move in the captured image if the imaging device 2 is displaced. Thus, one or more embodiments of the present invention is applicable to the tracking of a target object moving in an obtained time-series image.

[Other Modifications]

An object tracking device according to one or more embodiments of the present invention which tracks a target object in a time-series image including a plurality of frames includes: a location information acquisition unit that acquires location information of a target object, which is a tracked target, in a first frame; a detailed contour model generation unit that generates a detailed contour model in the first frame, on the basis of the location information, the detailed contour model being formed with a plurality of contour points representing a contour of the target object; a search location setting unit that sets a plurality of different search locations in a second frame which is any one of frames following the first frame; a rough contour model generation unit that identifies a plurality of first associated points at each search location in the second frame which correspond to locations of the plurality of contour points, when the detailed contour model is applied to each search location, that selects, as second associated points, a first predetermined number of points out of the plurality of first associated points which are fewer than the plurality of first associated points, and that generates a rough contour model formed with the second associated points; a likelihood assessment unit that compares, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification unit that identifies the location of the target object from the plurality of search locations, on the basis of the likelihoods determined by the likelihood assessment unit.

The object tracking method according to one or more embodiments of the present invention in which an object is tracked in a time-series image including a plurality of frames includes: a location information acquisition step of acquiring location information of a target object, which is a tracked target, in a first frame; a detailed contour model generation step of generating a detailed contour model in the first frame, on the basis of the location information, the detailed contour model being formed with a plurality of contour points representing a contour of the target object; a search location setting step of setting a plurality of different search locations in a second frame which is any one of frames following the first frame; a rough contour model generation step of identifying a plurality of first associated points corresponding to locations of the plurality of contour points at each search location in the second frame, when the detailed contour model is applied to each search location, selecting, as second associated points, a first predetermined number of points out of the plurality of first associated points which is fewer than the plurality of first associated points, and generating a rough contour model formed with the second associated points; a likelihood assessment step of comparing, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification step of identifying the location of the target object from among the plurality of search locations, on the basis of the likelihoods determined at the likelihood assessment step.

Herein, the image feature amount refers to a feature amount, such as a brightness difference or edge strength, that is obtained from pixel values of pixels related to (corresponding to) the associated points or contour points.

With the above configuration, the rough contour model that is formed with the second associated points being fewer than the contour points constituting the detailed contour model is generated at each search location, and the location of the target object is tracked with the rough contour model. This makes it possible to make processing required to track the target object (for example, respective processes performed by a generation unit of the rough contour model and the likelihood assessment unit) faster than that of generating the detailed contour model at each search location (for example, as in Patent Document 1 or 2).

Furthermore, using the rough contour model makes it possible to improve the capability in following the target object, because even if a shape of the target object is changed with time, the changed shape of the target object is quite likely to match a shape of the rough contour model.

In addition, using the rough contour model makes it possible to reduce the throughput at each search location, thereby increasing the number of the search locations by the reduced throughput. This also improves the capability in following the target object.

Consequently, it is possible to ensure both capability in following the target object and high-speed processing.

In the object tracking device according to one or more embodiments of the present invention, it is desirable for the rough contour model generation unit to: at each search location, determine the respective contour degrees at the first associated points to which the first associated points represent the contour, on the basis of the second image feature amount related to the first associated points in the second frame; select one or more of the plurality of first associated points at which the contour degrees fall within a ranking order from the highest to the first predetermined number-th, as the second associated points; and generate the rough contour model formed with the second associated points.

According to the above configuration, the plurality of first associated points that correspond to the locations of the plurality of contour points of the detailed contour model are identified at each search locations, and respective contour degrees at the first associated points to which the first associated points represent the contour are determined, based on the second image feature amount related to the first associated points in the second frame. Furthermore, one or more of the plurality of first associated points at which the contour degrees fall within a ranking order from the highest to the first predetermined number-th are selected, as the second associated points, and the rough contour model formed with the second associated points is generated.

Therefore, the rough contour model is formed with the one or more of the plurality of first associated points which have a higher degree of representing the contour. Thus, this rough contour model becomes an effective model with a small amount of information (a small number of associated points).

In the object tracking device according to one or more embodiments of the present invention, it is desirable for the rough contour model generation unit to determine the contour degrees, in accordance with edge strengths of the second frame which correspond to the first associated points or differences among a plurality of pixel values in the second frame which correspond to the first associated points.

According to the above configuration, the contour degrees are determined, in accordance with edge strengths of the second frame which correspond to the first associated points or differences among a plurality of pixel values in the second frame which correspond to the first associated points. Therefore, the effective contour degrees can be generated in the image of the second frame.

In the object tracking device according to one or more embodiments of the present invention, it is desirable for the rough contour model generation unit to determine the contour degree at each first associated point, in accordance with a difference between a first pixel value difference and a second pixel value difference. Here, the first pixel value difference is a difference between a pixel value of a point on an inner side of the contour represented by the plurality of first associated points in the second frame and a pixel value corresponding to each first associated point, and the second pixel value difference is a difference between a pixel value of a point on an outer side of the contour and the pixel value corresponding to each first associated point.

According to the above configuration, the contour degree is determined at each first associated point, on the basis of a difference between the first and second pixel value differences. Here, the first pixel value difference is a difference between a pixel value of a point on an inner side of the contour represented by the plurality of first associated points in the second frame and a pixel value corresponding to each first associated point, and the second pixel value difference is a difference between a pixel value of a point on an outer side of the contour and the pixel value corresponding to each first associated point. Thus, it is possible to generate the effective contour degrees in the image of the second frame.

In the object tracking device according to one or more embodiments of the present invention, it is desirable for the rough contour model generation unit to determine the contour degree at each first associated point, in accordance with a third pixel value difference and the first and second pixel value differences. Here, the third pixel value difference is a difference in pixel value between each of the first associated points and another one of the first associated points which is positioned adjacent to the first associated point, in the contour represented by the plurality of first associated points in the second frame.

According to the above configuration, the contour degree is determined at each first associated point, on the basis of the first, second and third pixel value differences. Here, the third pixel value difference is a difference in pixel value between each of the first associated points and another one of the first associated points which is positioned adjacent to the first associated point, in the contour represented by the plurality of first associated points in the second frame. Thus, it is possible to improve the precision of the contour degrees.

In the object tracking device according to one or more embodiments of the present invention, it is desirable for the rough contour model generation unit to determine the contour degree at each of the plurality of first associated points to which each first associated point represents the contour, on the basis of pixel values in first regions corresponding to each first associated point and one or more reference points positioned at specific locations around each first associated point, thereby determining the contour degrees at the plurality of first associated points, select one or more of the plurality of first associated points at which contour degrees fall within a ranking from the top to the first predetermined number-th, as the second associated points, and generate the rough contour model formed with the second associated points.

According to the above configuration, the contour degree to which each of the plurality of first associated points represents the contour is determined at each first associated point, on the basis of pixel values in first regions corresponding to each first associated point and one or more reference points positioned at specific locations around each first associated point, so that the contour degrees are determined at the plurality of first associated points. Here, for the reference points of each first associated point, two of the first associated points which are arranged along the contour and adjacent to the corresponding first associated point, and respective points which are positioned on inner and outer sides of the corresponding first associated point and adjacent thereto can be used.

Accordingly, the contour degree is determined at each first associated point, with the corresponding first associated point and reference points surrounding it. This enables the contour degrees to be determined more appropriately than when the contour degrees are determined only with the first associated points.

Furthermore, the one or more of the plurality of first associated points at which the contour degrees fall within a ranking from the top to the first predetermined number-th are selected, and the rough contour model formed with the second associated points is generated. Therefore, the rough contour model is formed with the one or more of the plurality of first associated points which have a higher degree of representing the contour. Thus, this rough contour model becomes an effective model with a small amount of information (a small number of associated points).

It is desirable for the object tracking device according to one or more embodiments of the present invention to further include: a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than a second predetermined number. It is desirable for the rough contour model generation unit to, when the determination result attained by the search location number assessment unit exceeds the second predetermined number after the generation of the rough contour model, increase region sizes of the first regions corresponding to the plurality of first associated points and the reference points thereof by a predetermined size, at each of the search locations narrowed by the search location narrowing unit, and determine the contour degrees at the plurality of first associated points, on the basis of pixel values in each first region increased in region size, thereby re-generating the rough contour model. It is desirable that the likelihood assessment unit assess the likelihood of the rough contour model re-generated by the rough contour model generation unit, and the search location narrowing unit further narrow the search locations that have been narrowed by the search location narrowing unit to one or more of the search locations, on the basis of the likelihood assessed by the likelihood assessment unit. It is desirable that the search location number assessment unit determine whether or not the number of search locations further narrowed by the search location narrowing unit is equal to or less than the second predetermined number, and when the determination result attained by the search location number assessment unit is equal to or less than the second predetermined number, the object location identification unit locate the location of the target object in the second frame, from the search locations narrowed by the search location narrowing unit.

According to the above configuration, when the number of search locations narrowed by the search location narrowing unit exceeds the second predetermined number, the region sizes of the first regions corresponding to the plurality of first associated points and the reference points thereof are increased by the predetermined size, at each of the search locations narrowed by the search location narrowing unit, and the contour degrees are determined at the plurality of first associated points, on the basis of the pixel values of each first region increased in region size. As a result, the rough contour model is re-generated.

When the region size of each first region is increased by the predetermined size in the above manner, the contour degree can be determined at this each associated point more precisely by the increased size. Therefore, the rough contour model is generated on the basis of the more precise contour degree, despite the same number of associated points. Consequently, the precision with which the target object is searched for is improved.

It is desirable for the object tracking device according to one or more embodiments of the present invention to include: a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than a second predetermined number. It is desirable for the rough contour model generation unit to, when the determination result attained by the search location number assessment unit exceeds the second predetermined number after the generation of the rough contour model, increase the first predetermined number by a predetermined number, at each of the search locations narrowed by the search location narrowing unit, and re-generate the rough contour model. It is desirable that the likelihood assessment unit assess the likelihood of the rough contour model re-generated by the rough contour model generation unit, and the search location narrowing unit further narrow the search locations that have been narrowed by the search location narrowing unit to one or more of the search locations, on the basis of the likelihood assessed by the likelihood assessment unit. It is desirable that the search location number assessment unit determine whether or not the number of search locations further narrowed by the search location narrowing unit is equal to or less than the predetermined second number, and when the determination result attained by the search location number assessment unit is equal to or less than the predetermined second number, the object location identification unit identify the location of the target object in the second frame, from the search locations further narrowed by the search location narrowing unit.

According to the above configuration, when the number of search locations narrowed by the search location narrowing unit exceeds the second predetermined number, the first predetermined number (namely, the number of associated points constituting the rough contour model) at each of the search locations narrowed by the search location narrowing unit is increased by the predetermined number, and the rough contour model is re-generated. When the first predetermined number is increased by the predetermined number in the above manner, the rough degree of the rough contour model is decreased by one stage. Thus, the rough contour model in which the rough degree is decreased by one stage (namely, which is somewhat specified) is re-generated.

As a result, first, the search is roughly and speedily conducted over a large area by using the rough contour model having the high rough degree. Then, the search can be conducted in detail while the number of search locations is being narrowed and the rough degree is being gradually decreased. Consequently, it is possible to detect the target object from the image efficiently (namely, promptly).

In the object tracking device according to one or more embodiments of the present invention, the location information acquisition unit to, when the location of the target object in the second frame is identified by the object location identification unit, acquires location information of the target object in the second frame which has been identified by the object location identification unit, and treat the second frame as the first frame.

According to the above configuration, when the location of the target object in the second frame is identified by the object location identification unit, the location information acquisition unit acquires the location information of the target object in the second frame which has been identified by the object location identification unit, and treats the second frame as the first frame. As a result, on the basis of the location of the target object which has been identified in the second frame, the same processes are repeated in the individual process units (the detailed contour model generation unit, the search location setting unit, the rough contour model generation unit, likelihood assessment unit, and the object location identification unit), so that the location of the target object is identified in any of frames following the second frame. Consequently, it is possible to automatically track the target object that has been first identified in a certain frame.

In particular, the detailed contour model generation unit generates the detailed contour model, on the basis of the contour of the target object identified in the second frame. Therefore, even if a shape of the target object is changed, it is possible to track the target object in consideration of the changed shape.

(Program and Recording Medium)

The above object tracking device may be partially implemented using a computer. In this case, by operating a computer as the above units, a control program that implements the object tracking device with the computer, and a computer readable recording medium that stores the control program are also included in the scope of the present invention.

Each block in the object tracking device 10, in particular, each of the object designation unit 21, the object location identification unit 22, the contour extraction unit 29, the detailed contour model generation unit 30, the search location setting unit 31, the rough contour model generation unit 32, the likelihood assessment unit 33, the search location narrowing unit 34, the assessment unit 35, the object location identification unit 36, and the tracking result output unit 38 may be configured of hardware logic or implemented using software and a CPU (central processing unit) as will be described below.

Specifically, the object tracking device 10 includes: a CPU that executes an instruction from a control program implementing each function; a ROM (read only memory) that stores the program: a RAM (random access memory) that expands the program; and a storage device (recording medium), such as a memory, that stores the program and various types of data. Further, a recording medium, onto which a program code (execute form, intermediate code or source program) of a control program for the object tracking device 10 to be software implementing the above function is stored in a computer readable manner, is supplied to the object tracking device 10, and the computer (or a CPU or MPU (microprocessor unit)) reads and executes the program code stored in the recording medium.

For the above recording medium, for example, a tape system such as a magnetic tape or cassette tape, a disk system including: a magnetic disk such as a Floppy Disk™/hard disk; and an optical disc such as a CD-ROM (compact disc read-only memory)/MO (magneto-optical)/MD (mini disc)/DVD (digital versatile disk)/CD-R (CD Recordable), a card system such as an IC card (including a memory card)/an optical card, or a semiconductor memory system such as a mask ROM/EPROM (erasable programmable read-only memory)/EEPROM (electrically erasable and programmable read-only memory)/flash ROM may be used.

The object tracking device 10 may be configured to be connectable to a communication network, and the above program code may be supplied through the communication network. There is no specific limitation on this communication network. For example, the Internet, an intranet, an extranet, LAN (local area network), an ISDN (integrated services digital network), a VAN (value-added network), a CATV (community antenna television) communication network, a virtual private network, a telephone line network, a mobile communication network, a satellite communication network, or the like is available. There is no specific limitation on a transmission medium constituting a communication network. For example, either a wired medium, including a IEEE (institute of electrical and electronic engineers) 1394, a USB, power line transfer, a cable television line, a telephone line, and an ADSL (asynchronous digital subscriber loop) line, or a wireless medium, including infrared such as IrDA (infra red data association) or remote control, Bluetooth™, 802.11 communication, an HDR (high data rate), a cellular phone network, a satellite connection, or a digital terrestrial network is available.

The present invention is not limited to the embodiments as described above, and various modifications thereof can be made without departing from the scope described in the claims. Even an embodiment obtained by appropriately combining the modified technical means within the scope described in the claims is also included in the technical scope of the present invention.

One or more embodiments of the present invention can be used for apparatuses that track a target object in a moving image, such as digital cameras, digital video cameras, and cellular phones equipped with a camera.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 object tracking system
2 imaging device
3 focus control device
10 object tracking device (target object tracking device)
11 image acquisition unit
12 storage unit
13 initialization unit
14 tracking unit
21 object designation unit
22 object location identification unit (location information acquisition unit)
29 contour extraction unit
30 detailed contour model generation unit
31 search location setting unit
32 rough contour model generation unit
33 likelihood assessment unit
34 search location narrowing unit
35 assessment unit (search location number assessment unit)
36 object location identification unit (location information acquisition unit)
38 tracking result output unit
G1•G2 images
S1 to Sm search locations
T target object
Q•Q2 locations of target object
X1 to Xn contour points
Y1 to Yn first associated points
Ya1 to Yau second associated points

The invention claimed is:

1. An object tracking device which tracks a target object in a time-series image including a plurality of frames, the object tracking device comprising:
a location information acquisition unit that acquires location information of a target object in a first frame, the target object being a tracked target;
a detailed contour model generation unit that generates a detailed contour model in the first frame, on the basis of the location information, the detailed contour model being formed with a plurality of contour points representing a contour of the target object;
a search location setting unit that sets a plurality of different search locations in a second frame, the second frame being any one of frames following the first frame;
a rough contour model generation unit that identifies a plurality of first associated points at each search location in the second frame which correspond to locations of the plurality of contour points, when the detailed contour model is applied to each search location, the rough contour model generation unit selecting a first predetermined number of points out of the plurality of first associated points as second associated points, the first predetermined number being fewer than the first associated points, and generating a rough contour model formed with the second associated points;
a likelihood assessment unit that compares, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and
an object location identification unit that identifies the location of the target object from the plurality of search locations, on the basis of the likelihoods determined by the likelihood assessment unit.

2. The object tracking device according to claim 1, wherein the rough contour model generation unit, at each search location:
determines respective contour degrees at the first associated points to which the first associated points represent the contour, on the basis of a third image feature amount related to the first associated points in the second frame, and
selects one or more of the plurality of first associated points at which the contour degrees fall within a ranking order from the highest to the first predetermined number-th, as the second associated points, and generates the rough contour model formed with the second associated points.

3. The object tracking device according to claim 2, wherein the rough contour model generation unit determines the contour degrees, in accordance with edge strengths of the second frame which correspond to the first associated points or differences among a plurality of pixel values in the second frame which correspond to the first associated points.

4. The object tracking device according to claim 2,
wherein the rough contour model generation unit determines the contour degree at each first associated point, in accordance with a difference between a first pixel value difference and a second pixel value difference,
wherein the first pixel value difference is a difference between a pixel value of a point on an inner side of the contour represented by the plurality of first associated points in the second frame and a pixel value corresponding to each first associated point, and
wherein the second pixel value difference is a difference between a pixel value of a point on an outer side of the contour and the pixel value corresponding to each first associated point.

5. The object tracking device according to claim 4,
wherein the rough contour model generation unit determines the contour degree at each first associated point, on the basis of a third pixel value difference and the first and second pixel value differences, and
wherein the third pixel value difference is a difference in pixel value between each of the first associated points and another one of the first associated points which is positioned adjacent to the first associated point, in the contour represented by the plurality of first associated points in the second frame.

6. The object tracking device according to claim 5, further comprising:
a search location narrowing unit that narrows the plurality of search locations to one or more of the search locations, on the basis of the likelihoods assessed by the likelihood assessment unit; and
a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the predetermined second number, and wherein, when the determination result attained by the search location number assessment unit is equal to or less than the predetermined second number, the object location identification unit identifies the locate of the target object in the second frame, from the search locations further narrowed by the search location narrowing unit.

7. The object tracking device according to claim 4, further comprising:

a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the predetermined second number, and wherein, when the determination result attained by the search location number assessment unit is equal to or less than the predetermined second number, the object location identification unit identifies the locate of the target object in the second frame, from the search locations further narrowed by the search location narrowing unit.

8. The object tracking device according to claim 3, further comprising:

a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the predetermined second number, and wherein, when the determination result attained by the search location number assessment unit is equal to or less than the predetermined second number, the object location identification unit identifies the locate of the target object in the second frame, from the search locations further narrowed by the search location narrowing unit.

9. The object tracking device according to claim 2, wherein the rough contour model generation unit:

determines the contour degree at each of the plurality of first associated points to which each first associated point represents the contour, on the basis of pixel values in first regions corresponding to each first associated point and one or more reference points positioned at specific locations around each first associated point, thereby determining the contour degrees at the plurality of first associated points, and selects one or more of the plurality of first associated points at which contour degrees fall within a ranking from the top to the first predetermined number-th, as the second associated points, and generates the rough contour model formed with the second associated points.

10. The object tracking device according to claim 9, further comprising:

a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the predetermined second number, and wherein, when the determination result attained by the search location number assessment unit is equal to or less than the predetermined second number, the object location identification unit identifies the locate of the target object in the second frame, from the search locations further narrowed by the search location narrowing unit.

11. The object tracking device according to claim 2, further comprising:

a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the predetermined second number, and wherein, when the determination result attained by the search location number assessment unit is equal to or less than the predetermined second number, the object location identification unit identifies the locate of the target object in the second frame, from the search locations further narrowed by the search location narrowing unit.

12. The object tracking device according to claim 2, wherein, when the location of the target object in the second frame is identified by the object location identification unit, the location information acquisition unit acquires location information of the target object in the second frame which has been identified by the object location identification unit, and treats the second frame as the first frame.

13. The object tracking device according to claim 1, wherein the rough contour model generation unit:

determines the contour degree at each of the plurality of first associated points to which each first associated point represents the contour, on the basis of pixel values in first regions corresponding to each first associated point and one or more reference points positioned at specific locations around each first associated point, thereby determining the contour degrees at the plurality of first associated points, and selects one or more of the plurality of first associated points at which contour degrees fall within a ranking from the top to the first predetermined number-th, as the second associated points, and generates the rough contour model formed with the second associated points.

14. The object tracking device according to claim 13, further comprising:

a search location narrowing unit that narrows the plurality of search locations to one or more of the search locations, on the basis of the likelihoods assessed by the likelihood assessment unit; and a search location number assessment unit that determines whether or not the number of search locations narrowed by the search location narrowing unit is equal to or less than the second predetermined number, wherein, when the determination result attained by the search location number assessment unit exceeds the second predetermined number after the generation of the rough contour model, the rough contour model generation unit increases region sizes of the first regions corresponding to the plurality of first associated points and the reference points thereof by a predetermined size, at each of the search locations narrowed by the search location narrowing unit, and determines the contour degrees at the plurality of first associated points, on the basis of pixel values in each first region increased in region size, thereby re-generating the rough contour model, wherein the likelihood assessment unit assesses the likelihood of the rough contour model re-generated by the rough contour model generation unit, wherein the search location narrowing unit further narrows the search locations that have been narrowed by the search location narrowing unit to one or more of the search locations, on the basis of the likelihood assessed by the likelihood assessment unit, wherein the search location number assessment unit determines whether or not the number of search locations further narrowed by the search location narrowing unit is equal to or less than the second predetermined number, and wherein, when the determination result attained by the search location number assessment unit is equal to or less than the second predetermined number, the object location identification unit identifies the location of the target object in the second frame, from the search locations narrowed by the search location narrowing unit.

15. The object tracking device according to claim 14, further comprising:
  a search location narrowing unit that narrows the plurality of search locations to one or more of the search locations, on the basis of the likelihoods assessed by the likelihood assessment unit; and
  a search location number assessment unit that determines whether or not the number of search locations narrowed by the search location narrowing unit is equal to or less than the second predetermined number,
  wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model,
  wherein the likelihood assessment unit assesses the likelihood of the rough contour model re-generated by the rough contour model generation unit,
  wherein the search location narrowing unit further narrows the search locations that have been narrowed by the search location narrowing unit to one or more of the search locations, on the basis of the likelihood assessed by the likelihood assessment unit,
  wherein the search location number assessment unit determines whether or not the number of search locations further narrowed by the search location narrowing unit is equal to or less than the predetermined second number, and
  wherein, when the determination result attained by the search location number assessment unit is equal to or less than the predetermined second number, the object location identification unit identifies the locate of the target object in the second frame, from the search locations further narrowed by the search location narrowing unit.

16. The object tracking device according to claim 13, further comprising:
  a search location narrowing unit that narrows the plurality of search locations to one or more of the search locations, on the basis of the likelihoods assessed by the likelihood assessment unit; and
  a search location number assessment unit that determines whether or not the number of search locations narrowed by the search location narrowing unit is equal to or less than the second predetermined number,
  wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model,
  wherein the likelihood assessment unit assesses the likelihood of the rough contour model re-generated by the rough contour model generation unit,
  wherein the search location narrowing unit further narrows the search locations that have been narrowed by the search location narrowing unit to one or more of the search locations, on the basis of the likelihood assessed by the likelihood assessment unit,
  wherein the search location number assessment unit determines whether or not the number of search locations further narrowed by the search location narrowing unit is equal to or less than the predetermined second number, and
  wherein, when the determination result attained by the search location number assessment unit is equal to or less than the predetermined second number, the object location identification unit identifies the locate of the target object in the second frame, from the search locations further narrowed by the search location narrowing unit.

17. The object tracking device according to claim 1, further comprising:
  a search location narrowing unit that narrows the plurality of search locations to one or more of the search locations, on the basis of the likelihoods assessed by the likelihood assessment unit; and
  a search location number assessment unit that determines whether or not the number of search locations narrowed by the search location narrowing unit is equal to or less than the second predetermined number,
  wherein, when the determination result attained by the search location number assessment unit exceeds the second predetermined number after the generation of the rough contour model, the rough contour model generation unit increases the first predetermined number by a predetermined number, at each of the search locations narrowed by the search location narrowing unit, and re-generates the rough contour model,
  wherein the likelihood assessment unit assesses the likelihood of the rough contour model re-generated by the rough contour model generation unit,
  wherein the search location narrowing unit further narrows the search locations that have been narrowed by the search location narrowing unit to one or more of the search locations, on the basis of the likelihood assessed by the likelihood assessment unit,
  wherein the search location number assessment unit determines whether or not the number of search locations further narrowed by the search location narrowing unit is equal to or less than the predetermined second number, and
  wherein, when the determination result attained by the search location number assessment unit is equal to or less than the predetermined second number, the object location identification unit identifies the locate of the target object in the second frame, from the search locations further narrowed by the search location narrowing unit.

18. The object tracking device according to claim 1, wherein, when the location of the target object in the second frame is identified by the object location identification unit, the location information acquisition unit acquires location information of the target object in the second frame which has been identified by the object location identification unit, and treats the second frame as the first frame.

19. An object tracking method of tracking an object in a time-series image including a plurality of frames, the object tracking method comprising:
  a location information acquisition step of acquiring location information of a target object in a first frame, the target object being a tracked target;
  a detailed contour model generation step of generating a detailed contour model in the first frame, on the basis of the location information, the detailed contour model being formed with a plurality of contour points representing a contour of the target object;

a search location setting step of setting a plurality of different search locations in a second frame, the second frame being any one of frames following the first frame;

a rough contour model generation step of identifying a plurality of first associated points corresponding to locations of the plurality of contour points at each search location in the second frame, when the detailed contour model is applied to each search location, and selecting a first predetermined number of points out of the plurality of first associated points as second associated points, and generating a rough contour model formed with the second associated points, the first predetermined number being fewer than the plurality of first associated points;

a likelihood assessment step of comparing, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification step of identifying the location of the target object from the plurality of search locations, on the basis of the likelihoods determined at the likelihood assessment step.

20. A control program stored on a non-transitory computer-readable medium that causes a computer to perform a process of tracking an object in a time-series image including a plurality of frames, the control program causing the computer to execute:

a location information acquisition step of acquiring location information of a target object in a first frame, the target object being a tracked target;

a detailed contour model generation step of generating a detailed contour model in the first frame, on the basis of the location information, the detailed contour model being formed with a plurality of contour points representing a contour of the target object;

a search location setting step of setting a plurality of different search locations in a second frame, the second frame being any one of frames following the first frame;

a rough contour model generation step of identifying a plurality of first associated points corresponding to locations of the plurality of contour points at each search location in the second frame, when the detailed contour model is applied to each search location, and selecting a first predetermined number of points out of the plurality of first associated points as second associated points, and generating a rough contour model formed with the second associated points, the first predetermined number being fewer than the plurality of first associated points;

a likelihood assessment step of comparing, at each search location, a second image feature amount related to the second associated points of the rough contour model in an image of the second frame with a first image feature amount related to one or more of the contour points of the detailed contour model in an image of the first frame which correspond to the second associated points, thereby assessing likelihoods that the individual search locations in the second frame are a location of the target object; and an object location identification step of identifying the location of the target object from the plurality of search locations, on the basis of the likelihoods determined at the likelihood assessment step.

* * * * *